United States Patent
Rubaiat Habib et al.

(10) Patent No.: US 11,574,450 B2
(45) Date of Patent: Feb. 7, 2023

(54) SYSTEMS FOR AUGMENTED REALITY SKETCHING

(71) Applicant: Adobe Inc., San Jose, CA (US)

(72) Inventors: Kazi Rubaiat Habib, Seattle, WA (US); Stephen Joseph DiVerdi, Berkeley, CA (US); Ryo Suzuki, Boulder, CO (US); Li-Yi Wei, Emerald Hills, CA (US); Wilmot Wei-Mau Li, Seattle, WA (US)

(73) Assignee: Adobe Inc, San Jose, CA (US)

(*) Notice: Subject to any disclaimer, the term of this patent is extended or adjusted under 35 U.S.C. 154(b) by 0 days.

(21) Appl. No.: 17/511,385

(22) Filed: Oct. 26, 2021

(65) Prior Publication Data
US 2022/0148267 A1 May 12, 2022

Related U.S. Application Data

(63) Continuation of application No. 16/983,798, filed on Aug. 3, 2020, now Pat. No. 11,158,130.

(51) Int. Cl.
*G06T 19/00* (2011.01)
*G06F 3/04815* (2022.01)
*G06F 3/04845* (2022.01)

(52) U.S. Cl.
CPC ........ *G06T 19/006* (2013.01); *G06F 3/04815* (2013.01); *G06F 3/04845* (2013.01); *G06T 2200/24* (2013.01)

(58) Field of Classification Search
CPC ............... G06T 19/006; G06T 2200/24; G06F 3/04815; G06F 3/04845; G06F 3/0488; G06F 3/011
See application file for complete search history.

(56) References Cited

U.S. PATENT DOCUMENTS

| 11,158,130 B1 | 10/2021 | Rubaiat Habib et al. |
| 2010/0073502 A1 | 3/2010 | An et al. |
| 2011/0211754 A1 | 9/2011 | Litvak et al. |

(Continued)

OTHER PUBLICATIONS

"Byju's the Learning App", Retrieved at: https://byjus.com/—on May 13, 2020, 8 pages.

(Continued)

*Primary Examiner* — Jeffery A Brier

(74) *Attorney, Agent, or Firm* — FIG. 1 Patents

(57) ABSTRACT

In implementations of systems for augmented reality sketching, a computing device implements a sketch system to generate three-dimensional scene data describing a three-dimensional representation of a physical environment including a physical object. The sketch system displays a digital video in a user interface that depicts the physical environment and the physical object and the sketch system tracks movements of the physical object depicted in the digital video using two-dimensional coordinates of the user interface. These two-dimensional coordinates are projected into the three-dimensional representation of the physical environment. The sketch system receives a user input connecting a portion of a graphical element in the user interface to the physical object depicted in the digital video. The sketch system displays the portion of the graphical element as moving in the user interface corresponding to the movements of the physical object depicted in the digital video.

20 Claims, 37 Drawing Sheets

(56) References Cited

U.S. PATENT DOCUMENTS

2019/0051054 A1    2/2019    Jovanovic et al.

OTHER PUBLICATIONS

"Explorable Explanations", Retrieved at: https://explorabl.es/—May 12, 2020, 4 pages.
"Feel Physics", Retrieved at: https://www.feel-physics.jp/—on May 15, 2020, 13 pages.
"First Action Interview Office Action", U.S. Appl. No. 16/983,798, dated Apr. 20, 2021, 3 pages.
"Gallery of Concept Visualization", Retrieved at: https://conceptviz.github.io/#/e30=—on May 13, 2020, 31 pages.
"Google Science Journal", Retrieved at: https://sciencejournal.withgoogle.com/—on May 13, 2020, 5 pages.
"NEX Team Inc.—HomeCourt.", Retrieved at: https://www.homecourt.ai/—on May 13, 2020, 17 pages.
"NHK for School", Retrieved at: https://www.nhk.or.jp/school/—on May 14, 2020, 8 pages.
"Notice of Allowance", U.S. Appl. No. 16/983,798, dated Jun. 17, 2021, 12 pages.
"PBS: Public Broadcasting Service—Nova", Retrieved at: https://www.pbs.org/wgbh/nova/—on May 15, 2020, 12 pages.
"Pre-Interview First Office Action", U.S. Appl. No. 16/983,798, dated Apr. 1, 2021, 3 pages.
Arora, Rahul et al., "Experimental Evaluation of Sketching on Surfaces in VR", May 2017, 12 pages.
Arora, Rahul et al., "SymbiosisSketch: Combining 2D & 3D Sketching for Designing Detailed 3D Objects in Situ", Apr. 21, 2018, 15 pages.
Bajpai, Manisha, "Developing Concepts in Physics Through Virtual Lab Experiment: An Effectiveness Study", May 2013, 8 pages.
Barnes, Connelly et al., "Video Puppetry: A Performative Interface for Cutout Animation", Dec. 2008, 9 pages.
Belcher, John W., "Studio Physics at MIT", Sep. 2001, pp. 58-63.
Billinghurst, Mark, "Augmented Reality in Education", Jul. 2012, 5 pages.
Borning, Alan, "The programming language aspects of ThingLab, a constraint-oriented simulation laboratory", Oct. 1981, 35 pages.
Boyd, Andrew et al., "Interactive video: A bridge between motion and math", Jan. 1996, pp. 57-93.
Brosz, John et al., "Transmogrification: Casual Manipulation of Visualizations", Oct. 2013, 10 pages.
Chao, William O., "NapkinVis: Rapid Pen-Centric Authoring of Improvisational Visualizations", Jan. 2010, 9 pages.
Chen, Zhutian et al., "MARVisT: Authoring Glyph-based Visualization in Mobile Augmented Reality", Aug. 2015, 13 pages.
Dillenbourg, Pierre, "Design for classroom orchestration", Nov. 2013, pp. 485-492.
Furio, David et al., "HOBIT: Hybrid Optical Bench for Innovative Teaching", Jul. 13, 2017, 12 pages.
Gambaretto, Emiliano et al., "Real-Time Animation of Cartoon Character Faces", Jan. 2014, 1 page.
Gandhi, Rohith, "R-CNN, Fast R-CNN, Faster R-CNN, YOLO—Object Detection Algorithms", Towards Data Science, Medium Publishing [retrieved Apr. 1, 2021]. Retrieved from the Internet <https://towardsdatascience.com/r-cnn-fast-r-cnn-faster-r-cnn-yolo-object-detection-algorithms-36d53571365e>., Jul. 9, 2018, 11 pages.
Glauser, Oliver et al., "Rig Animation with a Tangible and Modular Input Device", Jul. 2016, 2 pages.
He, Kaiming et al., "Mask R-CNN", In Proceedings of the IEEE International Conference on Computer Vision, Jan. 24, 2018, 12 pages.
Held, Robert T. et al., "3D Puppetry: A Kinect-based Interface for 3D Animation", Oct. 2012, 11 pages.
Hodson, Derek, "Laboratory work as scientific method: three decades of confusion and distortion", Mar. 1996, pp. 115-135.
Johnson, Gabe et al., "Sketch It, Make It: Sketching Precise Drawings for Laser Cutting", May 2012, pp. 1079-1082.
Kang, Seokbin et al., "SharedPhys: Live Physiological Sensing, Whole-Body Interaction, and Large-Screen Visualizations to Support Shared Inquiry Experiences", Jun. 2016, pp. 275-287.
Kay, Alan, "Squeak Etoys, Children & Learning", Retrieved at: http://www.squeakland.org/resources/articles/—on May 13, 2020, 8 pages.
Kazi, Rubaiat H. et al., "DRACO: Bringing Life to Illustrations with Kinetic Textures", Jun. 10, 2014, pp. 351-360.
Kazi, Rubaiat H. et al., "Kitty: Sketching Dynamic and Interactive Illustrations", Oct. 5, 2014, pp. 395-405.
Kazi, Rubaiat H. et al., "Motion Amplifiers: Sketching Dynamic Illustrations Using the Principles of 2D Animation", May 7, 2016, 11 pages.
Kim, Yoonji et al., "VirtualComponent: A Mixed-Reality Tool for Designing and Tuning Breadboarded Circuits", May 2019, 13 pages.
Kwan, Kin C. et al., "MobiSDSketch: 3D Sketching in Mobile AR", May 2, 2019, 11 pages.
La Viola, Joseph J. et al., "MathPad2: A System for the Creation and Exploration of Mathematical Sketches", Aug. 2004, pp. 432-440.
Lee, Bongshin et al., "SketchStory: Telling More Engaging Stories with Data through Freeform Sketching", IEEE Transactions on Visualization and Computer Graphics, vol. 19, No. 12 [retrieved Jun. 21, 2021]. Retrieved from the internet <http://www.cs.ucf.edu/courses/cap6105/fall2013/readings/Lee2013.pdf>., Oct. 16, 2013, 10 pages.
Li, Yuwei et al., "SweepCanvas: Sketch-based 3D Prototyping on an RGB-D Image", UIST '17: Proceedings of the 30th Annual ACM Symposium on User Interface Software and Technology [retrieved Feb. 12, 2021]., Retrieved from the Internet <https://www.researchgate.net/profile/Yuwei_Li10/publication/320574341_SweepCanvas_Sketch-based_3D_Prototyping_on_an_RGB-D_Image/links/59f843eea6fdcc075ec7e01e/SweepCanvas-Sketch-based-3D-Prototyping-on-an-RGB-D-Image.pdf>., Oct. 2017, pp. 387-399.
Lindlbauer, David et al., "Remixed Reality: Manipulating Space and Time in Augmented Reality", CHI '18: Proceedings of the 2018 CHI Conference on Human Factors in Computing Systems [retrieved Feb. 12, 2021]. Retrieved from the Internet, <https://www.researchgate.net/profile/David_Lindlbauer/publication/324659385_Remixed_Reality_Manipulating_Space_and_Time_in_Augmented_Reality/links/5b854bbf4585151fd13798ee/Remixed-Reality-Manipulating-Space-and-Time-in-Augmented-Reality.pdf>., Apr. 2018, 13 pages.
Liu, Zhicheng et al., "Data Illustrator: Augmenting Vector Design Tools with Lazy Data Binding for Expressive Visualization Authoring", Apr. 2018, 13 pages.
McComas, William F. et al., "The role and character of the nature of science in science education", Jan. 1998, 37 pages.
Mynatt, Elizabeth D. et al., "Flatland: New Dimensions in Office Whiteboards", May 1999, 8 pages.
Narumi, Koya et al., "ConductAR: An Augmented Reality Based Tool for Iterative Design of Conductive Ink Circuits", Sep. 7, 2015, 10 pages.
Nuernberger, Benjamin et al., "SnapToReality: Aligning Augmented Reality to the Real World", May 7, 2016, 12 pages.
Oppenheimer, Frank, "The Exploratorium: A Playful Museum Combines Perception and Art in Science Education", Jul. 1972, 7 pages.
Perkins, Katherine et al., "PhET: Interactive Simulations for Teaching and Learning Physics", Jan. 2006, 6 pages.
Perlin, Ken et al., "Chalktalk : A Visualization and Communication Language", Sep. 19, 2018, 6 pages.
Perlin, Ken et al., "Chalktalk VR/AR", Jan. 2017, 2 pages.
Piper, Ben et al., "Illuminating Clay: A 3-D Tangible Interface for Landscape Analysis", Apr. 2002, 8 pages.
Radu, Iulian et al., "What Can We Learn from Augmented Reality (AR)?", May 2019, 12 pages.
Redmon, Joseph et al., "You Only Look Once: Unified, Real-Time Object Detection", Computer Vision and Pattern Recognition (2016), May 9, 2016, 10 pages.
Ren, Shaoqing et al., "Faster R-CNN: Towards Real-Time Object Detection with Region Proposal Networks", arXiv preprint arXiv:1506.01497v2, Sep. 13, 2015, 10 pages.

(56) References Cited

OTHER PUBLICATIONS

Saquib, Nazmus et al., "Interactive Body-Driven Graphics for Augmented Video Performance", Feb. 2, 2019, 13 pages.
Scott, Jeremy et al., "PhysInk: Sketching Physical Behavior", Oct. 2013.
Sousa, L et al., "Augmented reality system to assist inexperienced pool players", Jun. 2016, pp. 183-193.
Sutherland, Ivan E., "Sketchpad a man-machine graphical communication system", Jan. 1964, pp. 329-346.
Suzuki, Ryo et al., "Reactile: Programming Swarm User Interfaces through Direct Physical Manipulation", Apr. 2018, 13 pages.
Tanaka, Yuka, "A Real-Time Golf-Swing Training System Using Sonification and Sound Image Localization", Dec. 2018, 2 pages.
Underkoffler, John et al., "Urp: A Luminous-Tangible Workbench for Urban Planning and Design", May 1999, 8 pages.
Victor, Bret, "Additional Notes on Drawing Dynamic Visualizations", http://worrydream.com/#!/DrawingDynamicVisualizationsTalkAddendum, May 21, 2013, 10 pages.
Victor, Bret, "Seeing Spaces", Retrieved at: https://vimeo.com/97903574—on May 18, 2020, 1 pages.
Weichel, Christian et al., "MixFab: A Mixed-Reality Environment for Personal Fabrication", Apr. 26, 2014, 10 pages.
Wieman, Carl E. et al., "PhET: Simulations That Enhance Learning", Oct. 2008, pp. 682-683.
Willett, Wesley et al., "Embedded Data Representations", Nov. 2016, 11 pages.
Wu, Hsin-Kai, "Current status, opportunities and challenges of augmented reality in education", Mar. 2013, pp. 41-49.
Xing, Jun et al., "Energy-Brushes: Interactive Tools for Illustrating Stylized Elemental Dynamics", Oct. 2016, 12 pages.

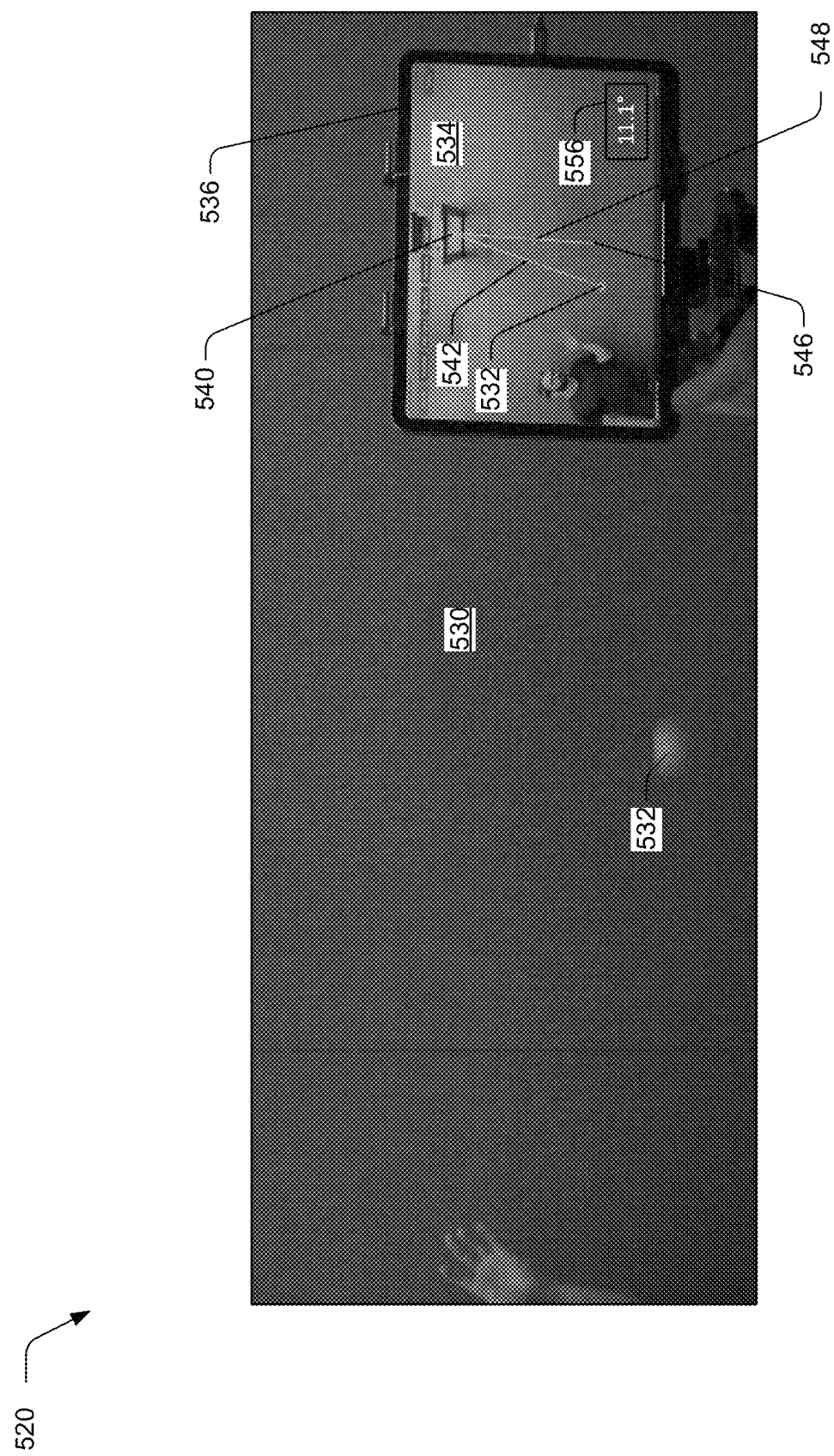

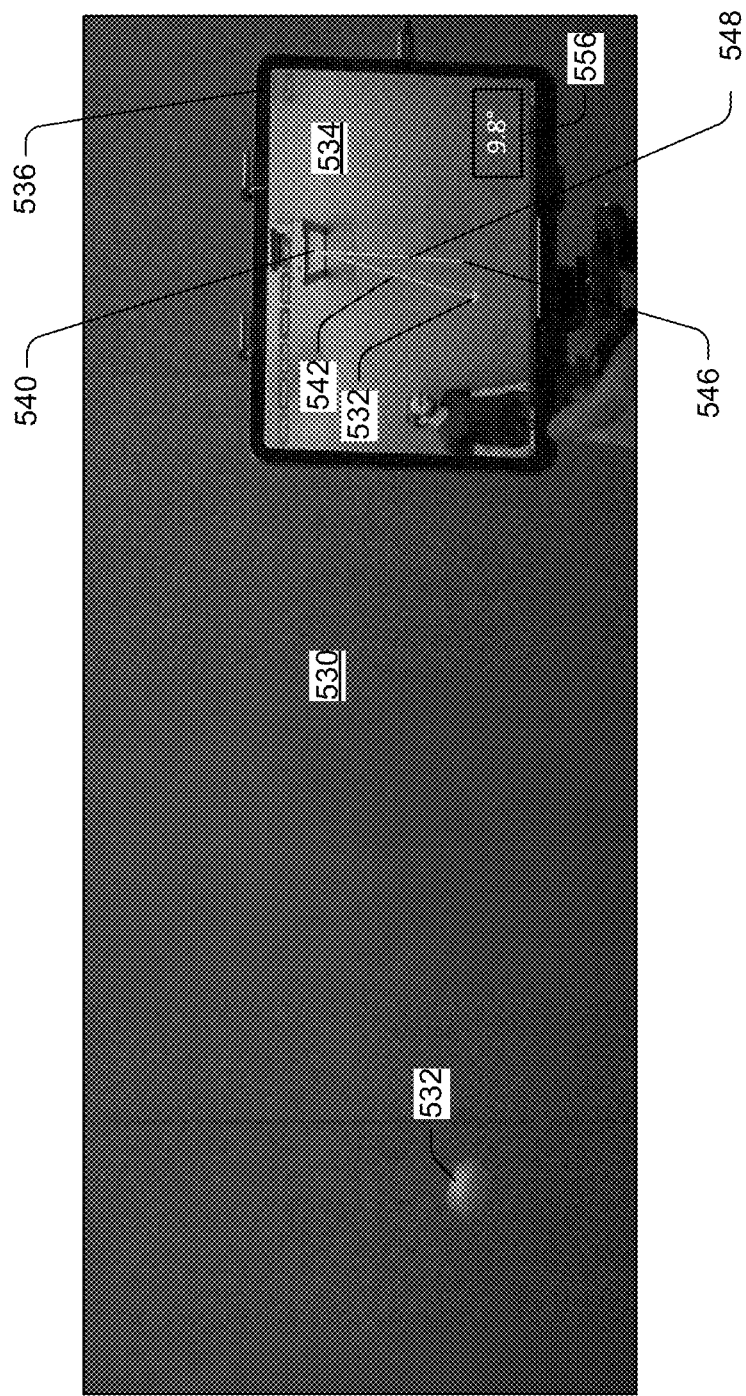

SYSTEMS FOR AUGMENTED REALITY SKETCHING

RELATED APPLICATIONS

This application is a continuation of and claims priority to U.S. patent application Ser. No. 16/983,798, filed Aug. 3, 2020, entitled "Systems for Augmented Reality Sketching", the entire disclosure of which is hereby incorporated by reference herein in its entirety.

BACKGROUND

In an augmented reality environment, a user experience is created by a computing device that employs digital content to augment a user's direct view of a physical environment. For example, the user's direct view of the physical environment may include a body of water and the computing device augments this view by displaying the digital content as a virtual boat such that the virtual boat appears to float above the water of the physical environment. In augmented reality sketching, the user defines the digital content used to augment the user's (or another user's) direct view of the physical environment through interaction with a user interface. For example, the user can sketch a virtual flag for the virtual boat by providing user inputs via interactions in the user interface. In response to receiving these sketched inputs, the computing device renders the virtual flag on the virtual boat.

Conventional systems for augmented reality sketching are limited to augmenting a user's view of a physical environment using digital content that is either static with respect to physical objects of the physical environment or that appears to be interactive with the physical environment based on pre-defined movements, behaviors, and/or animations. Consider the previous example in which the user's direct view of the body of water is augmented with the virtual boat and a physical rainstorm causes large physical waves in the body of water. Conventional systems are limited to displaying the virtual boat as static such that the virtual boat does not interact with the physical waves or displaying the virtual boat as having pre-defined movements such that the virtual boat appears to be moving with the physical waves. In this example, the static virtual boat does not interact with the large physical waves during the physical rainstorm and the virtual boat having pre-defined movements appears to be moving with physical waves before the physical rainstorm causes the large physical waves.

SUMMARY

Systems and techniques are described for augmented reality sketching. A digital video is displayed in a user interface of a display device. The digital video depicts a physical environment including a physical object. In one example, a computing device implements a sketch system to generate three-dimensional scene data describing a three-dimensional representation of the physical environment and the physical object. The sketch system tracks movements of the physical object depicted in the digital video using two-dimensional coordinates of the user interface.

These two-dimensional coordinates are projected into the three-dimensional representation of the physical environment. The sketch system receives a user input connecting a portion of a graphical element in the user interface to the physical object depicted in the digital video. The sketch system displays the portion of the graphical element as moving in the user interface corresponding to the movements of the physical object depicted in the digital video. In this manner, the portion of the graphical object is displayed as moving in the user interface corresponding to physical movements of the physical object in the physical environment in substantially real time.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIGS. 5A, 5B, 5C, 5D, 5E, 5F, 5G, 5H, 5I, 5J, 5K, 5L, 5M, 5N, and 5O illustrate an example of a user interface for augmented reality sketching.

FIGS. 7A, 7B, 7C, 7D, 7E, and 7F illustrate an analysis of a recorded motion of a physical object.

DETAILED DESCRIPTION

Overview

Figure 1:
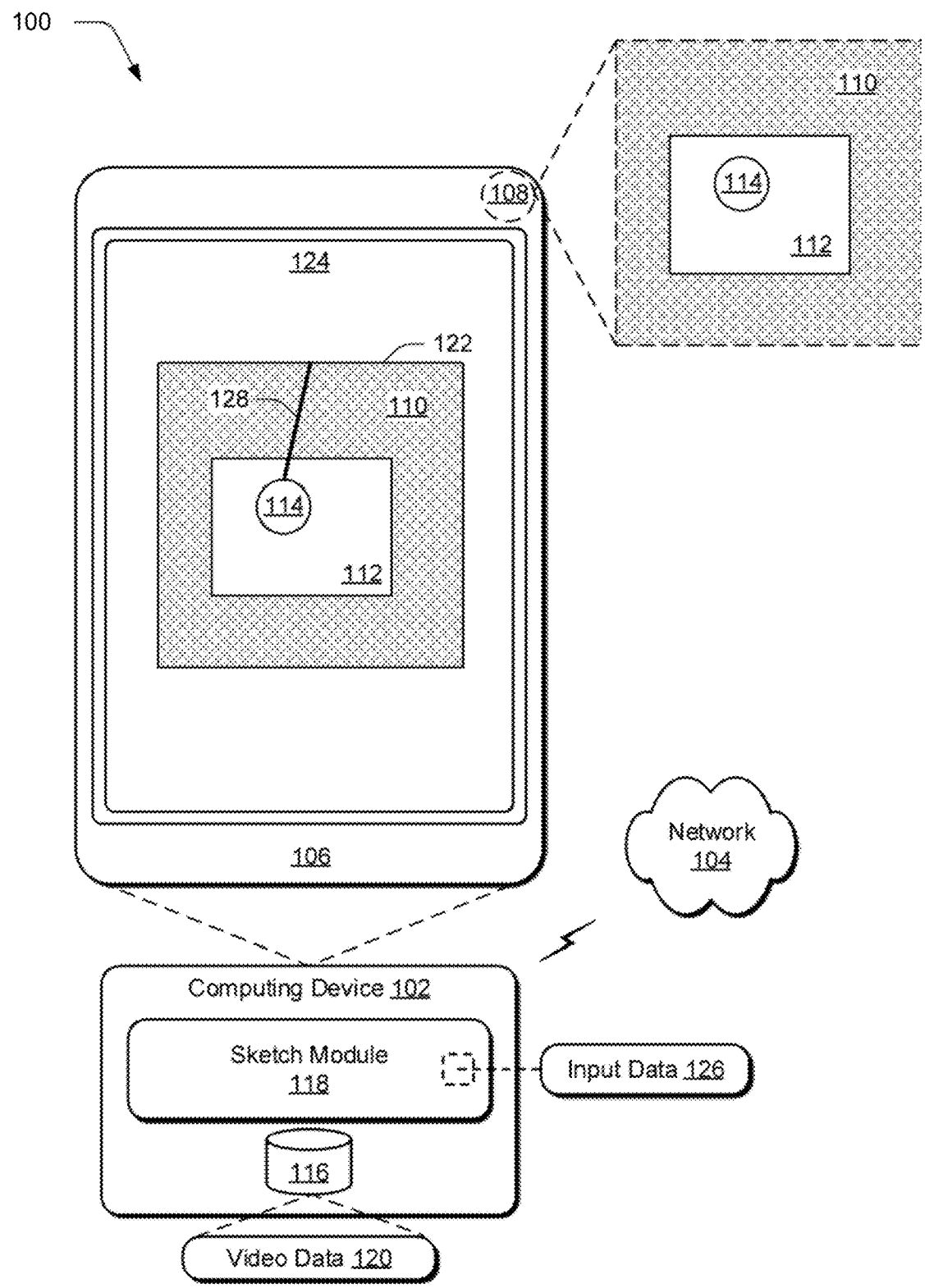
FIG. 1 is an illustration of an environment in an example implementation that is operable to employ digital systems and techniques for augmented reality sketching as described herein.

In systems for augmented reality sketching, user inputs are received that define sketched elements relative to a user's direct view of a physical environment. These systems render digital content over the user's view of the physical environment in response to receiving the user inputs such that the digital content augments the user's view of the physical environment. Conventional systems for augmented reality sketching are limited to augmenting a user's view of a physical environment using digital content that is either static with respect to physical objects of the physical environment or that appears to be interactive with the physical environment based on pre-defined patterns of movement, behaviors, and/or animations. Thus, conventional systems not capable of displaying sketched digital content dynamically bound to the physical objects of the physical environment based on user inputs defining the sketched digital content.

To overcome these limitations, a computing device implements a sketch system to generate three-dimensional scene data describing a three-dimensional representation of a physical environment and a physical object. The physical environment and the physical object are depicted in frames of a digital video displayed in a user interface of a display device. For example, the physical environment includes a surface and the sketch system detects the surface using an image capture device of the computing device. The sketch system uses this detected surface to generate the three-dimensional scene data.

To do so, the sketch system may access a sensor or multiple sensors of the computing device such as orientation sensors, acceleration sensors, position sensors, and so forth. For example, the sketch system generates the three-dimensional scene data through use of visual inertial odometry by estimating orientation and translation in response to movements of the image capture device relative to the physical environment. In an example, the sketch system uses data from the sensor or the sensors of the computing device to generate the three-dimensional scene data. In this manner, the sketch system generates the three-dimensional scene data as describing the physical environment and the physical object in three-dimensional coordinates.

The sketch system receives a user input indicating two-dimensional coordinates (e.g., x, y) of the user interface. For example, the two-dimensional coordinates corresponds to a position of the physical object depicted in the digital video. In response to receiving the user input, the sketch system tracks the physical object's position as depicted in the digital video. For example, the sketch system leverages object tracking techniques to track the physical object's two-dimensional position in the frames of the digital video displayed in the user interface.

In an example, the sketch system uses a color-based object tracking technique to track physical object's position in the digital video. In this example, the sketch system determines color values, for example, RGB values, corresponding to the two-dimensional coordinates indicated by the user input. The sketch system can generate a color mask for tracking the physical object's position in the digital video by identifying similar color values depicted in frames of the digital video. In one example, the similar colors values are identified as being within a threshold proximity of the two-dimensional coordinates in the user interface. In another example, the similar color values are identified using an upper and lower threshold based on the determined color values of the two-dimensional coordinates. The sketch system generates the color mask as including the color values and the similar color values in an example.

The sketch system determines a contour using the color mask. For example, the sketch system determines a largest contour of the color mask based on the color values and similar color values. The sketch system then computes a center position of the contour which corresponds to a center position of the physical object depicted in the digital video. As the physical object moves in frames of the digital video, the sketch system tracks these movements such that two-dimensional coordinates (e.g., x, y) of the user interface may be determined which correspond to the center position of the physical object depicted in the digital video.

The sketch system projects the two-dimensional coordinates of the user interface into the three-dimensional representation of the physical environment, for example, as three-dimensional coordinates. In one example, the sketch system ray casts a position defined by the two-dimensional coordinates onto the detected surface of the physical environment used to generate the three-dimensional representation. Three-dimensional coordinates are determined in the three-dimensional representation based on a point of intersection of between the cast ray and the detected surface.

As the physical object depicted in the digital video displayed in the user interface moves in the frames of the digital video, the sketch system tracks this movement using the two-dimensional coordinates of the center position of the physical object. The sketch system also projects the two-dimensional coordinates of the physical object into the three-dimensional representation of the physical environment. Thus, as the physical object moves in the digital video, a projection of a position of the physical object depicted in the digital video moves in the three-dimensional representation of the physical environment.

The sketch system also projects sketched digital content into the three-dimensional representation of the physical environment. For example, the sketch system receives a user input defining a two-dimensional line segment sketched in the user interface. The sketch system projects the two-dimensional line segment into the three-dimensional representation of the physical environment by ray casting two-dimensional coordinates of the line segment onto the detected surface of the physical environment.

In an example, the sketch system casts a ray through a two-dimensional position defined by two-dimensional coordinates of the line segment and onto the detected surface. In this example, the sketch system projects the two-dimensional coordinates into three-dimensional coordinates based on a point of intersection between the cast ray and the detected surface. In this manner, the sketch system projects the two-dimensional line segment into the three-dimensional representation such that a projection of the line segment has a three-dimensional geometry in the three-dimensional representation of the physical environment.

The sketch system may leverage this three-dimensional geometry to anchor the sketched line segment to the three-dimensional representation of the physical environment. In this example, the projection of the line segment in the three-dimensional representation remains anchored to its position in the three-dimensional representation regardless of movements of the image capture device and/or the computing device relative to the physical environment. The sketch system can also use the projection of the line segment in the three-dimensional representation to display indications of physical attributes of the physical environment. For example, the sketch system uses three-dimensional points corresponding to endpoints of the line segment to determine a physical distance in the physical environment as a length of the line segment. In one example, the sketch system renders an indication of this physical distance in the user interface of the display device.

Consider an example in which the sketch system receives a user input defining a line segment sketched in the user interface having a first end connected to the physical object depicted in the digital video and a second end connected to a stationary point of the physical environment as depicted in the digital video. In this example, the sketch system can use a projection of the sketched line segment in the three-dimensional representation to determine a physical distance between the physical object and the stationary point of the physical environment. For example, the sketch system renders an indication of this physical distance in the user interface.

By tracking the physical object depicted in the digital video and by projecting the tracked position of the physical object into the three-dimensional representation of the physical environment which also includes three-dimensional projections of sketched digital content, the sketch system enables a multitude of augmented reality sketching functionality. Consider the previous example in which the sketched line segment has the first end connected to the physical object the second end connected to the stationary point of the physical environment as depicted in the digital video. The sketch system can use tracked coordinates of the physical object and the projections in the three-dimensional representation to dynamically bind the first end of the line segment to the physical object such that the first end of the line segment moves in the user interface based on movements of the physical object in the physical environment. For example, the sketch system can use the projection of the sketched line segment in the three-dimensional representation to determine a physical distance between the physical object and the stationary point of the physical environment in substantially real time as this physical distance changes based on movements of the physical object in the physical environment. In an example, the sketch system renders an indication of this physical distance in the user interface.

Consider the previous example in which the first end of the line segment is dynamically bound to the physical object and the sketch system receives an additional user input defining an additional line segment sketched in the user interface forming an angle with the line segment. In this example, the sketch system leverages vector representations of the line segment and the additional line segment to determine a value of the angle as the value of the angle changes based on movements of the physical object in the physical environment. The sketch system renders an indication of the value of the angle in the user interface in one example.

In an example, the sketch system leverages object tracking and the projections in the three-dimensional representation to record a motion of the physical object in the physical environment and display graphical elements over a frame of the digital video illustrating a trajectory of the motion of the physical object. In another example, the sketch system tracks multiple physical objects depicted in the digital video. In this example, the sketch system receives another user input defining a sketched graphical element in the user interface having a first end connected to a first physical object and a second end connected to a second physical object depicted in the digital video. The sketch system determines a physical distance between the first physical object and the second physical object in substantially real time as the first physical object and/or the second physical object moves in the physical environment. For example, the sketch system renders an indication of this physical distance in the user interface.

By dynamically binding sketched digital content to a physical object depicted in a digital video and displaying the sketched digital content as moving in a user interface based on movements of the physical object, the described systems improve conventional augmented reality sketching technology which is not capable of such functionality. Unlike conventional systems, the described systems can bind sketched digital content to physical objects of a physical environment dynamically in substantially real time such that the sketched digital content interacts with physical objects in a manner specified by a user input. The technological improvements of the described systems may also improve surgical or athletic rehabilitation techniques by enabling sketched digital content to be bound to a physical body such as to illustrate a therapeutic motion as part of the rehabilitation. In another example, the described systems enable visualization of motion of a physical object such that a trajectory of the motion may be modified and this may be verified through visualization of the modified trajectory of the physical object.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes an image capture device 108 which may be implemented to capture digital images, digital videos, etc.

As shown, the image capture device 108 captures digital video frames depicting a physical environment 110. The physical environment 110 includes a detected surface 112 and a physical object 114. Although the computing device 102 is illustrated as including a single image capture device 108, it is to be appreciated that the image capture device 108 may be representative of multiple image capture devices 108. For example, the image capture device 108 represents a first image capture device 108 having a telephoto lens, a second image capture device 108 having a wide-angle lens, a third image capture device 108 having an ultra wide-angle lens, and so forth.

The computing device 102 also includes a storage device 116 and a sketch module 118. The storage device 116 is illustrated to include video data 120 describing the digital video frames captured by the image capture device 108. The computing device 102 implements the sketch module 118 to process the video data 120 and the sketch module 118 renders the digital video frames as a digital video 122 which is displayed in a user interface 124 of the display device 106. As illustrated, the digital video 122 depicts the physical environment 110 and the physical object 114 in the user interface 124.

For example, the image capture device 108 captures digital video frames depicting the physical object 114 as the physical object 114 moves in the physical environment 110. The sketch module 118 renders the captured digital video frames consecutively as the digital video 122 in the user interface 124. Thus, the physical object 114 depicted in the digital video 122 is displayed as moving in the user interface 124 corresponding to movements of the physical object 114 in the physical environment 110.

In one example, the video data 120 includes three-dimensional scene data describing a three-dimensional representation of the physical environment 110 and the physical object 114. In this example, the sketch module 118 generates the three-dimensional scene data based on the detected surface 112. To do so, the sketch module 118 may access one or more sensors of the computing device 102 such as orientation sensors, acceleration sensors, position sensors, and so forth. For example, the sketch module 118 generates the three-dimensional scene data through use of visual inertial odometry by estimating orientation and translation in response to movements of the image capture device 108 relative to the physical environment 110.

The sketch module 118 is illustrated as having, receiving, and/or transmitting input data 126. The input data 126 describes user inputs as part of augmented reality sketching. In one example, the input data 126 describes a user input selecting the physical object 114 depicted in the digital video 122. In this example, a user interacts with the user interface 124 such as by contacting the depicted physical object 114 in the user interface 124 with a finger or stylus to select the physical object 114 for tracking in the user interface 124. In response to receiving the input data 126 describing the selection of the physical object 114, the sketch module 118 tracks movements of the physical object 114 depicted in the digital video 122 using two-dimensional coordinates of the user interface 124. To track the physical object 114 depicted in the digital video 122, the sketch module 118 implements any suitable object tracking technique to track movements of an object depicted in a digital video.

In one example, the sketch module 118 tracks movements of the physical object 114 depicted in the digital video 122 based on a color of the physical object 114. In this example, the sketch module 118 determines an x-coordinate and a y-coordinate corresponding to a location of the physical object 114 in the user interface 124. This x-coordinate and y-coordinate can be coordinates of the user interface 124 corresponding to the user selection of the physical object 114 for tracking.

The sketch module 118 determines color values (e.g., RGB values) at the location of the x-coordinate and the y-coordinate in the user interface 124. The sketch module 118 then detects and masks similar colors (e.g., based on upper and lower thresholds) in each frame of the digital video 122. Based on the detected mask, the sketch module 118 determines a largest contour and computes a center position. With this, the sketch module 118 can locate a center position of the physical object 114 depicted in the digital video 122 as corresponding to the center position of the determined contour.

By tracking the physical object 114 depicted in the digital video 122 in this manner, the sketch module 118 can be implemented to determine two-dimensional coordinates of a center position of a location of the physical object 114 in the user interface 126. The sketch module 118 projects these two-dimensional coordinates into the three-dimensional representation of the physical environment 110 as three-dimensional coordinates. For example, the sketch module 118 ray casts the two-dimensional coordinates onto the detected surface 112 and obtains the three-dimensional coordinates based on an intersection of the ray and the detected surface 112. The sketch module 118 can also project other two-dimensional coordinates into the three-dimensional representation of the physical environment 110 to support a variety of augmented reality sketching functionality.

As shown, the input data 126 describes a graphical element 128 sketched in the user interface 124 over the digital video 122. The graphical element 128 is illustrated as a line segment having a first end connected to an upper portion of the digital video 122 and a second end connected to the physical object 114 depicted in the digital video 122. For example, a user interacts with the user interface 124 such as by contacting the user interface 124 with a finger or stylus to define the first end of the line segment. The user drags the finger or stylus within the user interface 124 and then the user raises the finger or stylus to define the second end of the line segment.

The sketch module 118 receives the input data 126 describing the sketched graphical element 128 and the sketch module 118 renders the graphical element 128 in the user interface 124 based on the input data 126. The sketch module 118 also projects the graphical element 128 into the three-dimensional representation of the physical environment 110. For example, the sketch module 118 projects two-dimensional coordinates of the graphical element 128 into the three-dimensional representation of the physical environment 110 as three-dimensional coordinates.

To do so, the sketch module 118 ray casts each of the two-dimensional coordinates of the graphical element 128 onto the detected surface 112. The sketch module 118 obtains the three-dimensional coordinates based on an intersection of each ray and the detected surface 112. Once projected into the three-dimensional representation, the graphical element 128 has a three-dimensional geometry and position within the three-dimensional representation of the physical environment 110.

The sketch module 118 leverages the three-dimensional representation of the graphical element 128 to provide augmented reality sketching functionality such as to display an indication of a distance between the first end and the second end of the line segment. The sketch module 118 displays this indication as a distance between a three-dimensional coordinate representing the first end of the line segment and a three-dimensional coordinate representing the second end of the line segment in the three-dimensional representation of the physical environment 110. In this way, the sketch module 118 displays the indication of the distance between the first end and the second end of the line segment as a physical distance in the physical environment 110.

The sketch module 118 can also use the three-dimensional representation of the graphical element 128 and the tracked position of the physical object 114 depicted in the digital video 122 to bind the graphical element 128 to the physical object 114 such as to display the graphical element 128 as moving in the user interface 124 corresponding to movements of the physical object 114 in the physical environment 110. For example, connecting the second end of the line segment to the physical object 114 depicted and tracked in the digital video 122 binds the graphical element 128 to the physical object 114. Once bound, the sketch module 118 processes the three-dimensional scene data to display the two-dimensional graphical element 128 as moving in the user interface 124 based on movements of the physical object 114 in the physical environment 110. In this manner, the sketch module 118 displays the graphical element 128 as moving when the physical object 114 depicted in the digital video 122 moves and displays the graphical element 128 as not moving when the physical object 114 depicted in the digital video 122 does not move.

By projecting two-dimensional graphical elements into the three-dimensional representation of the physical environment 110, the sketch module 118 provides a variety of augmented reality sketching functionality. For example, the sketch module 118 receives the input data 126 describing user inputs defining sketched line segments in the user interface 124. Based on these inputs, the sketch module 118 can bind distances, angles, and areas to physical objects such that these distances, angle, and areas dynamically change in the user interface 124 in response to movements of the physical objects in the physical environment 110.

The sketch module 118 can also bind parameters to virtual objects rendered in the user interface 124. Consider an example in which the sketch module 118 parameterizes variables such as a size or scale, a color, and/or a count which may be bound to digital content to support a variety of augmented reality sketching functionality. For example, a size or a scale of a virtual object can be bound to a length of a sketched line segment such that a user input reducing the length of the sketched line segment causes the sketch module 118 to reduce a size/scale of the virtual object rendered in the user interface 124. Similarly, a user input increasing the length of the sketched line segment causes the sketch module 118 to increase a size/scale of the virtual object rendered in the user interface 124.

A count of virtual objects can be bound to the length of the sketched line segment in one example. In this example, the user input reducing the length of the sketched line segment causes the sketch module 118 to reduce a number of the virtual objects rendered in the user interface 124. The user input increasing the length of the sketched line segment causes the sketch module 118 to increase a number of the virtual objects rendered in the user interface 124.

In an example, a color of a virtual object and/or a graphical element can also be bound to the length of the sketched line segment such that user inputs modifying the length of the sketched line segment cause the sketch module 118 to modify the color of the virtual object and/or the graphical element. In one example, the sketch module 118 modifies a shade of a base color of the virtual object and/or the graphical element based on user inputs. In this example, the user input reducing the length of the sketched line segment may cause the sketch module 118 to lighten the shade of the base color and the user input increasing the length can cause the sketch module 118 to darken the shade of the base color. In another example, increasing or decreasing the length of the sketched line segment causes the sketch module to change the base color of the virtual object and/or the graphical element such as to a lighter or darker base color. Although these examples are described with respect to the length of the sketched line segment, it is to be appreciated that variables can be bound to any digital content such as sketched user interface elements, depictions of physical objects, and so forth.

The sketch module 118 can also leverage the three-dimensional representation of the physical environment 110 to graphically display parameters bound to physical objects. For example, by tracking the physical object 114 depicted in the digital video 122, the sketch module 118 can generate a time series graph of a positon of the physical object 114 in the physical environment 110. In another example, the sketch module 118 receives the input data 126 describing two line segments sketched in the user interface 124 such that a first end of a first line segment intersects a second line segment to form an angle between the line segments, and a second end of the first line segment is bound to the physical object 114. In this example, the sketch module 118 generates a time series graph of a magnitude of the angle based on movements of the physical object 114.

The sketch module 118 can also record motion of physical objects for analysis using the three-dimensional representation of the physical environment 110 to record three-dimensional positions of a tracked object in frames of the digital video 122. For example, the sketch module 118 can record movement of the physical object 114 within the physical environment 110 and record positions the physical object 114 as three-dimensional coordinates of the three-dimensional representation. In this manner, the sketch module 118 can render graphical elements in the recorded positions to visually illustrate a trajectory of the movement of the physical object 114.

Figure 2:
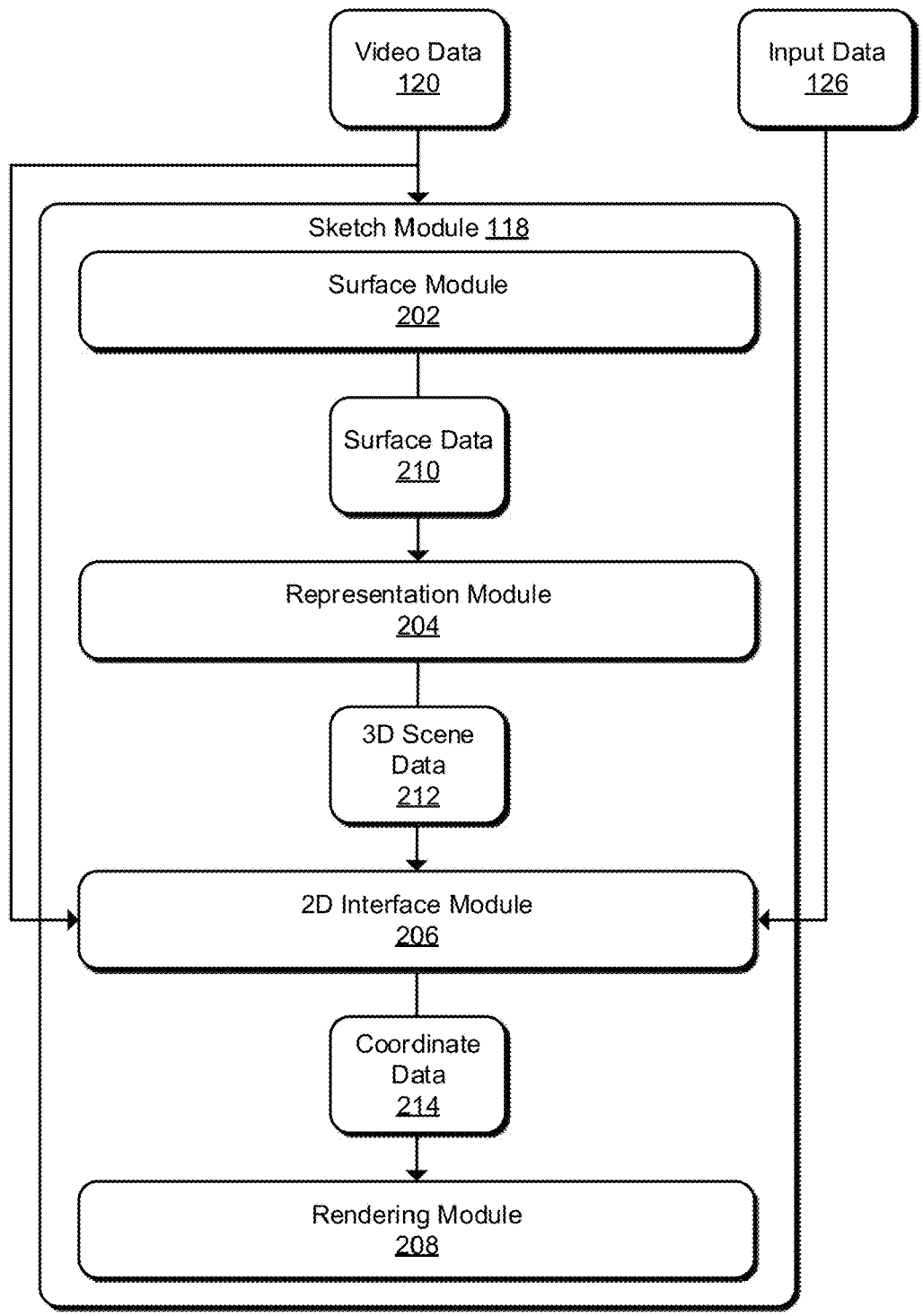
FIG. 2 depicts a system in an example implementation showing operation of a sketch module for augmented reality sketching.

FIG. 2 depicts a system 200 in an example implementation showing operation of a sketch module 118. The sketch module 118 is illustrated to include a surface module 202, a representation module 204, a two-dimensional interface module 206, and a rendering module 208. As shown, the sketch module 118 receives the video data 120 and the input data 126 as inputs. For example, the surface module 202 receives the video data 120 and processes the video data 120 to generate surface data 210. The video data 120 describes digital video frames depicting the physical environment 110 and the surface module 202 processes the video data 120 to detect the surface 112. The detected surface 112 may be a horizontal surface, a vertical surface, etc. The surface module 202 generates the surface data 210 as describing the detected surface 112.

The representation module 204 receives the surface data 210 and processes the surface data 210 to generate three-dimensional scene data 212. The three-dimensional scene data 212 describes a three-dimensional representation of the physical environment 110 and the physical object 114. For example, the representation module 204 generates the three-dimensional scene data 212 based on the detected surface 112 described by the surface data 210 using a mobile augmented reality platform such as ARKit and SceneKit, ARCore, Layar, Vuforia, etc. In this way, the representation module 204 leverages computer vision and internal accelerometer tracking of the computing device 102 to generate the three-dimensional scene data 212. Thus, the representation module 204 may generate the three-dimensional scene data 212 by accessing one or more sensors of the computing device 102 such as orientation sensors, acceleration sensors, position sensors, and so forth. In one example, the representation module 204 generates the three-dimensional scene data 212 through use of visual inertial odometry by estimating orientation and translation in response to movements of the image capture device 108 relative to the detected surface 112.

The representation module 204 generates the three-dimensional scene data 212 in substantially real time in one example. In this example, as the physical object 114 moves from a first position to a second position in the physical environment 110, a three-dimensional representation of the physical object 114 moves from a first position to a second position in the three-dimensional representation of the physical environment 110. The first position in the three-dimensional representation corresponds to the first position in the physical environment 110 and the second position in the three-dimensional representation corresponds to the second position in the physical environment 110.

The two-dimensional interface module 206 receives the three-dimensional scene data 212, the input data 126, and/or the video data 120 as inputs. As shown, the two-dimensional interface module 206 processes the three-dimensional scene data 212, the input data 126, and/or the video data 120 to generate coordinate data 214. The two-dimensional interface module 206 is implemented to project digital content sketched in the user interface 124 into the three-dimensional representation of the physical environment 110. For example, a user may sketch a graphical element in the user interface 124 of the display device 106 in two dimensions (e.g., x, y), and the two-dimensional interface module 206 projects the two dimensional graphical element into three-dimensional coordinates (e.g., x, y, z) of the three-dimensional representation of the physical environment 110.

To do so, the two-dimensional interface module 206 ray casts two-dimensional positions defined by two-dimensional coordinates of sketched inputs described by the input data 126 onto the detected surface 112. For example, the two-dimensional interface module 206 casts a ray through each two-dimensional position defined by the two-dimensional coordinates onto the detected surface 112. The two-dimensional interface module 206 determines three-dimensional coordinates of the three-dimensional representation corresponding to a two-dimensional position based on an intersection point of a ray cast through the two-dimensional position and the detected surface 112. The two-dimensional interface module 206 generates the coordinate data 214 as describing the determined three-dimensional coordinates of the three-dimensional representation of the physical environment 110.

By projecting two-dimensional sketched inputs into the three-dimensional representation in this way, the three-dimensional representation of the physical environment 110 can be leveraged to support a variety of augmented reality sketching functionality. Consider an example in which the input data 126 describes a line segment sketched over the digital video 122 in the user interface 124 and the two-dimensional interface module 206 projects the line segment into the three-dimensional representation by ray casting positions of two-dimensional coordinates of the line segment onto the detected surface 112. A projected three-dimensional representation of the line segment includes three-dimensional coordinates of the three-dimensional representation of the physical environment 110. These three-dimensional coordinates correspond to physical coordinates of the physical environment 110.

For example, the projected three-dimensional representation of the line segment may be used to indicate a length of the line segment where the length corresponds to a physical distance in the physical environment 110. In another example, the projected three-dimensional representation of the line segment is usable to bind a portion of the line segment to the physical object 114. In this example, the bound portion of the line segment may be displayed as moving in the user interface 124 corresponding to movement of the physical object 114 depicted in the digital video 112. As shown, the rendering module 208 receives the coordinate data 214 and processes the coordinate data 214 to render sketched digital content in the user interface 124.

Figure 3:
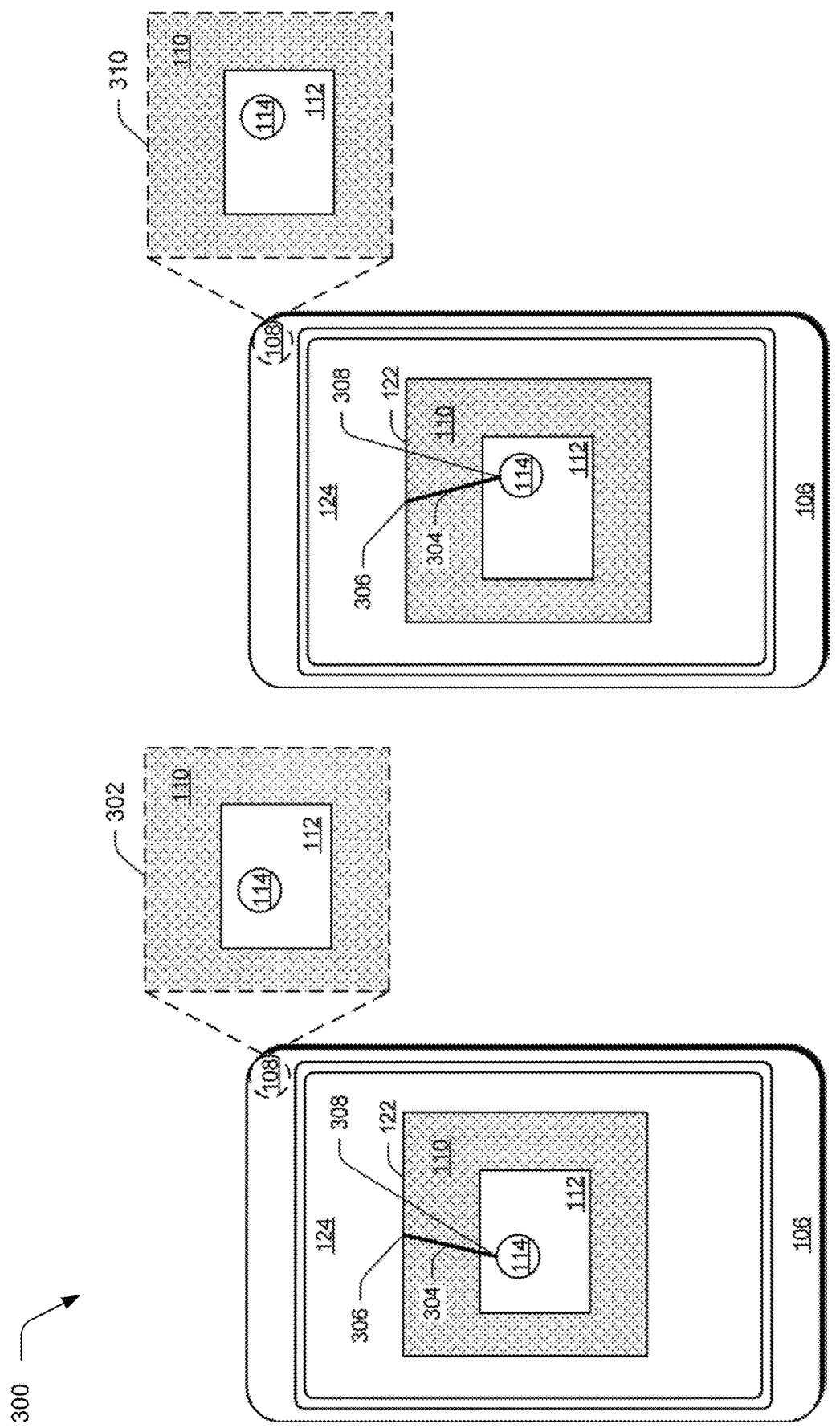
FIG. 3 is an illustration of an example representation of a sketched line segment bound to a physical object.

FIG. 3 is an illustration of an example representation 300 of a sketched line segment bound to a physical object. The representation 300 includes the physical environment 110 and the physical object 114 in a first position 302 within the physical environment 110. The physical environment 110 and the physical object 114 are depicted in digital video frames captured by the image capture device 108 which are displayed sequentially as the digital video 122 in the user interface 124 of the display device 106.

As shown, a two-dimensional line segment 304 has been sketched over the digital video 122 in the user interface 124. A first end of 306 of the line segment 304 is connected to a stationary point of the physical environment 110 depicted in the digital video 122. A second end 308 of the line segment 304 is connected to the physical object 114 as depicted in the digital video 122. Accordingly, the first and second ends 306, 308 of the line segment 304 are connected to depictions of the stationary point and the physical object 114, respectively. In order to display the line segment 304 as moving in the user interface 124 corresponding to movements of the physical object 114 within the physical environment 110, two-dimensional coordinates of the line segment 304 are projected into the three-dimensional representation.

For example, the sketch module 118 projects the line segment 304 into the three-dimensional representation of the physical environment 110 by ray casting the two-dimensional coordinates of the line segment 304 onto the detected surface 112. In this manner, the sketch module 118 casts a ray through each two-dimensional position defined by the two-dimensional coordinates of the line segment 304. The sketch module 118 determines three-dimensional coordinates of the three-dimensional representation corresponding to the two-dimensional coordinates of the line segment 304 based on points of intersection between the cast rays and the detected surface 112. Collectively, these three-dimensional coordinates define a three-dimensional representation of the line segment 304 within the three-dimensional representation of the physical environment 110. These three-dimensional coordinates also correspond to portions of the physical environment 110.

In one example, the sketch module 118 uses the coordinates of the three-dimensional representation of the line segment 304 and coordinates corresponding to the stationary point of the physical environment 110 to display the two-dimensional line segment 304 as having the first end 306 bound to the depiction of the stationary point in the digital video 122. In a similar example, the sketch module 118 uses the coordinates of the three-dimensional representation of the line segment 304 and coordinates corresponding to the physical object 114 to display the two-dimensional line segment 304 as having the second end 308 bound to the depiction of the physical object 114 in the digital video 122. To do so, the sketch module 118 tracks movement of the physical object depicted in the digital video 122 using two-dimensional coordinates of the user interface 124 and the sketch module 118 projects these two-dimensional coordinates into the three-dimensional representation.

As illustrated, the representation 300 includes the physical object 114 in a second position 310 within the physical environment 110. The digital video 122 depicts the physical object 114 in the first position 302 and in the second position 310. As shown, the second end 308 of the line segment 304 is displayed in the user interface 124 as moving based on the movement of the physical object 114 from the first position 302 to the second position 310. The first end 306 of the line segment 304 is displayed in the user interface 124 as being stationary and connected to the depiction of the stationary point in the digital video 122 as the physical object 114 moves from the first position 302 to the second position 310.

Figure 4:
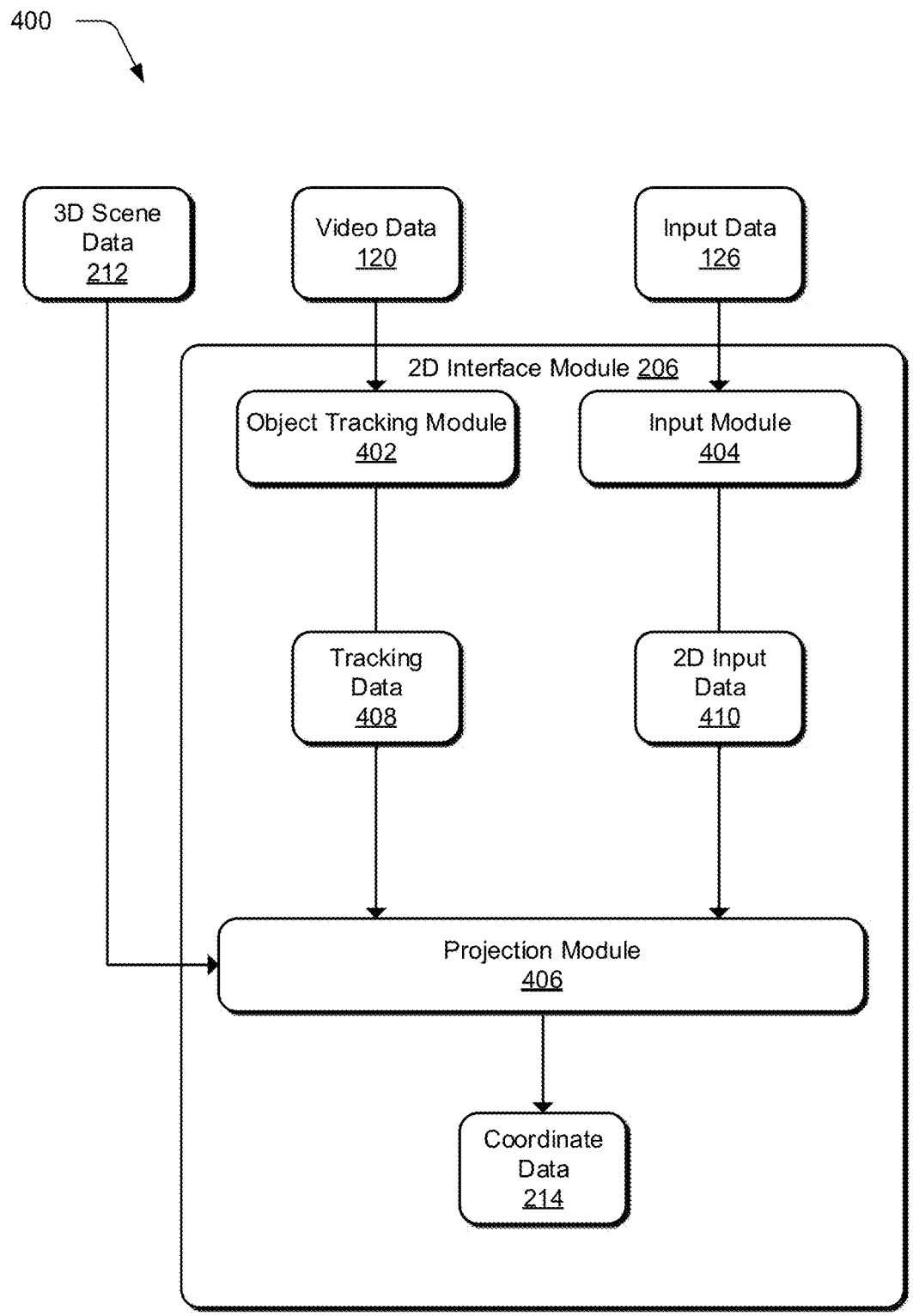
FIG. 4 depicts a system in an example implementation showing operation of a two-dimensional interface module.

FIG. 4 depicts a system 400 in an example implementation showing operation of a two-dimensional interface module 206. The two-dimensional interface module 206 is illustrated to include an object tracking module 402, an input module 404, and a projection module 406. As shown, the two-dimensional interface module 206 receives the video data 120, the input data 126, and/or the three-dimensional scene data 212 as inputs. For example, the object tracking module 402 receives the video data 120 and processes the video data 120 to generate tracking data 408.

The object tracking module 402 tracks the depiction of the physical object 114 in frames of the digital video 122. For example, the object tracking module 402 employs object tracking techniques for tracking an object depicted in a digital video such as tracking the object using visual features of the object. In an example, the object tracking module 402 leverages a computer vision library such as OpenCV as part of tracking the physical object 114 in the frames of the digital video 122. In another example, the object tracking module 402 utilizes a convolutional neural network to track the physical object 114 in the frames of the digital video 122. In this example, the object tracking module 402 tracks the physical object 114 using, for example, R-CNN, Fast R-CNN, Faster R-CNN, Mask-R-CNN, YOLO, etc.

In one example, the object tracking module 402 uses a color of the physical object 114 to track the physical object 114 in the frames of the digital video 112. In this example, the input data 126 describes a user input selecting the physical object 114 for tracking. For example, a user can select the physical object 114 for tracking by contacting a depiction of the physical object 114 in the user interface 124 with a stylus or finger. The object tracking module 402 determines an x-coordinate and a y-coordinate of the user interface 124 corresponding to the contacted portion. The object tracking module 402 then determines color values (e.g., RGB values) at the location of the x-coordinate and the y-coordinate in the user interface 124.

The object tracking module 402 uses the determined color values to detect and mask similar colors (e.g., based on upper and lower thresholds) depicted in each frame of the digital video 122. A largest contour is determined for the masked colors and the object tracking module 402 computes a center position of the determined contour. Two-dimensional coordinates of a center position of the physical object 114 depicted in the digital video 122 are located as corresponding to the computed center position of the determined contour. The object tracking module 402 generates the tracking data 408 as describing the two-dimensional coordinates of the center portion of the physical object 114.

As shown, the input module 404 receives the input data 126 and processes the input data 126 to generate two-dimensional input data 410. The input data 126 describes user inputs received via the user interface 124. For example, a user interacts with the user interface 124 such as by contacting the user interface 124 with a finger or stylus to define a start point of a line segment sketched over the digital video 122. The user drags the finger or stylus within the user interface 124 and then the user raises the finger or stylus to define an endpoint of the line segment.

The input module 404 uses the start point and the endpoint of the line segment to generate the line segment. For example, if the start point is near a tracked object in the user interface 124, then the input module 404 binds the start point to the tracked object. If the start point is near a first tracked object and the endpoint is near a second tracked object, then the input module 404 binds the start point to the first tracked object and binds the endpoint to the second tracked object. If the start point and the endpoint form a closed path of additional line segments, then the input module 404 determines that the line segment is part of a closed shape in the user interface 124.

For example, if the start point connects to a first line segment and if the endpoint connects to a second line segment, then the input module 404 determines that the line segment is an angle between the first and second line segments. If the start point and the endpoint are nearly perpendicular to an additional line segment, then the input module 404 determines that the line segment is a perpendicular line segment. The input module 404 generates the two-dimensional input data 410 as describing two-dimensional coordinates of user inputs included in the input data 126 based on these determinations.

The projection module 406 receives the three-dimensional scene data 212, the tracking data 408, and the two-dimensional input data 410, and the projection module 406 processes the three-dimensional scene data 212, the tracking data 408, and the two-dimensional input data 410 to generate the coordinate data 214. The projection module 406 projects the center position of the physical object 114 into the three-dimensional representation of the physical environment 110 by casting a ray through the center position of the physical object 114 onto the detected surface 112. In this way, the projection module 406 determines three-dimensional coordinates of the three-dimensional representation as corresponding to the center position of the physical object 114.

The projection module 406 also projects the two-dimensional coordinates described by the two-dimensional input data 410 into the three-dimensional representation of the physical environment 110 by casting a ray through each two-dimensional position defined by the coordinates onto the detected surface 112. For example, the projection module 406 determines three-dimensional coordinates of the three-dimensional representation as corresponding to the two-dimensional positions. The projection module 406 generates the coordinate data 214 as describing the three-dimensional coordinates corresponding to the center position of the physical object 114 and also describing the three-dimensional coordinates corresponding to the two-dimensional positions.

Figure 5A:
Figure 5B:
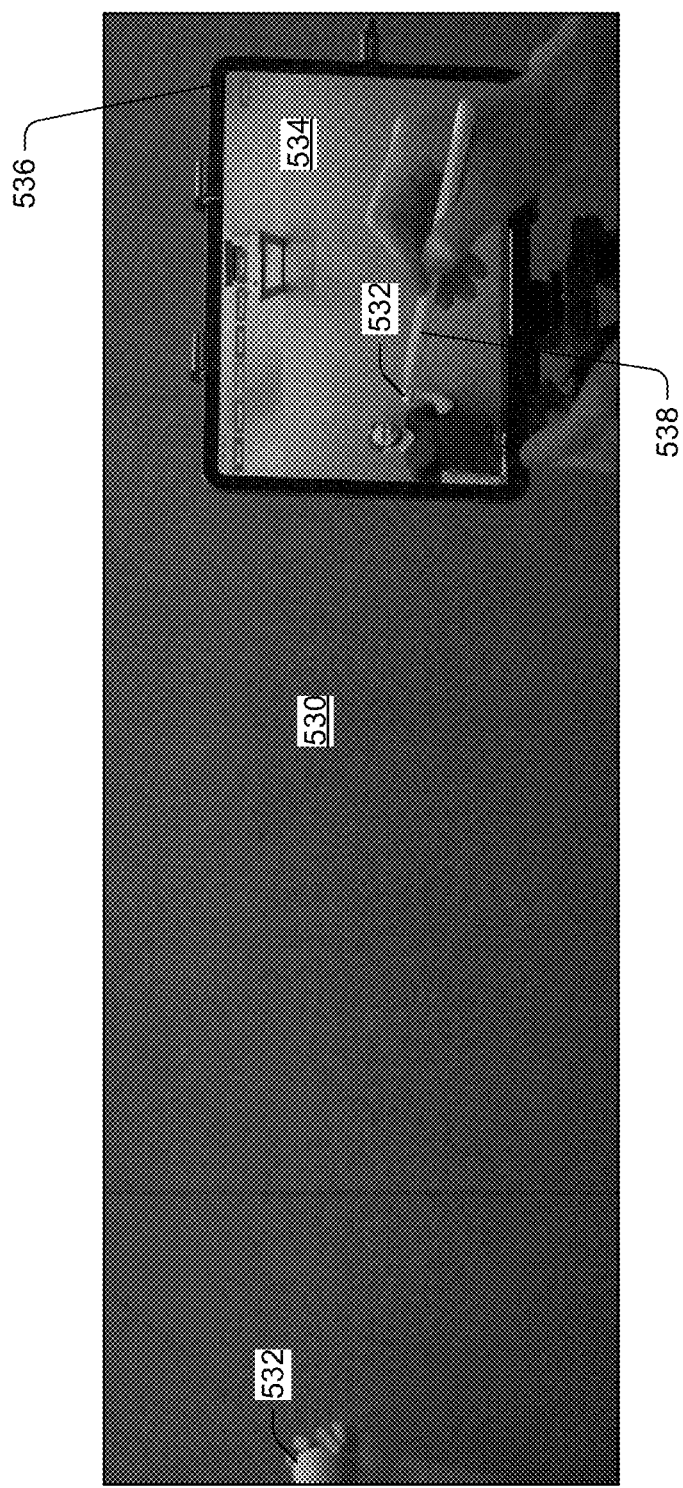
Figure 5C:
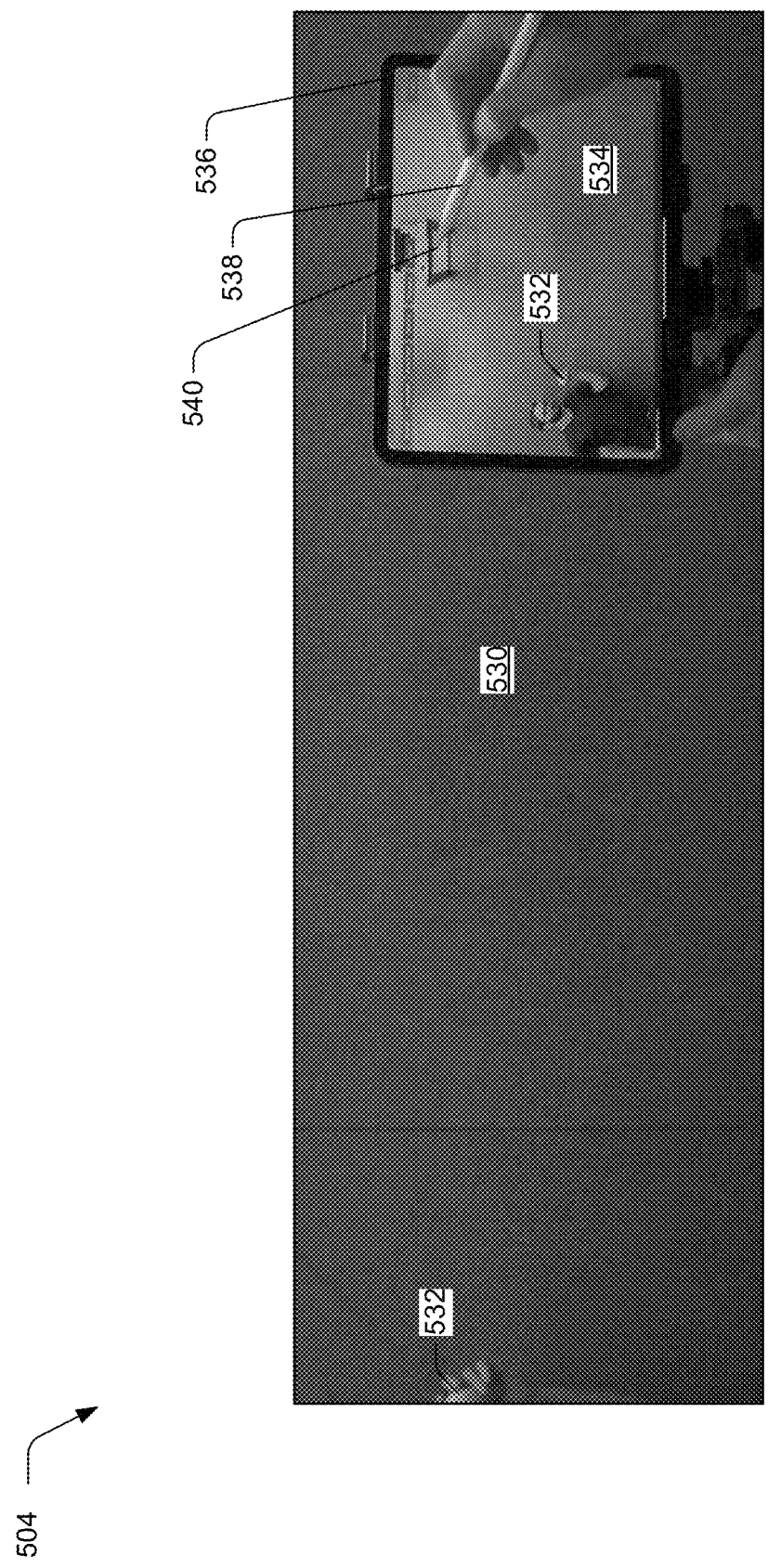
Figure 5D:
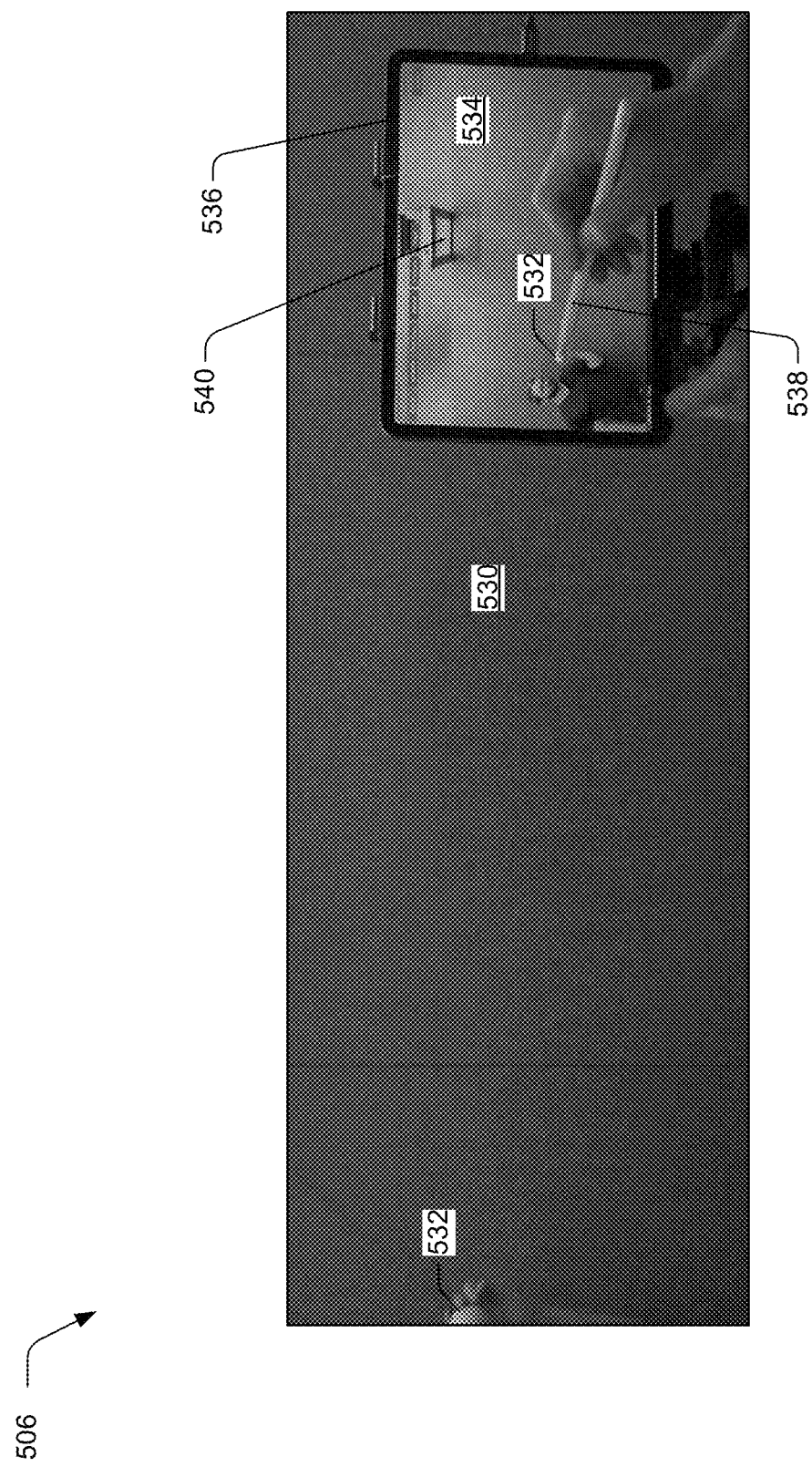
Figure 5E:
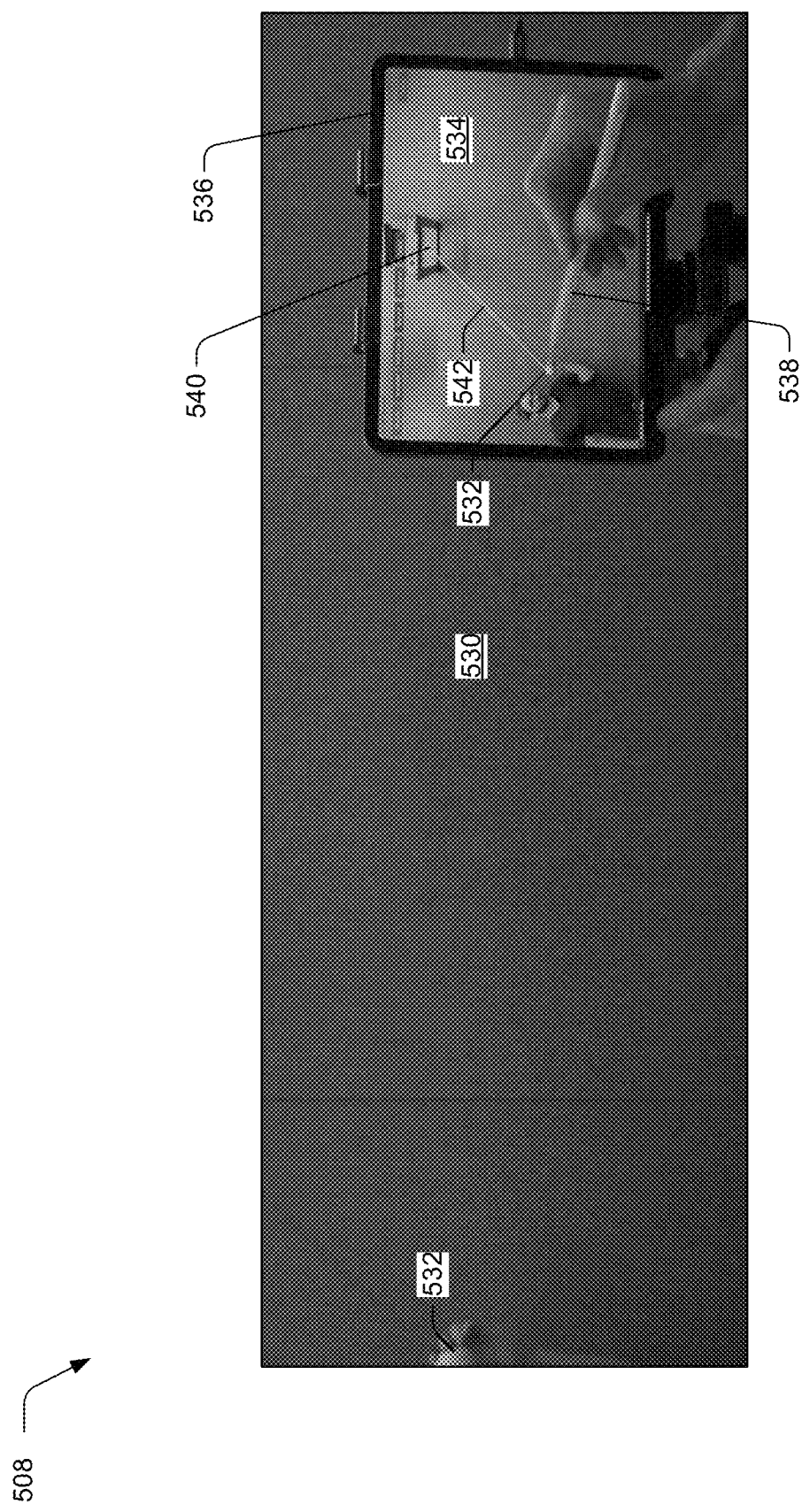
Figure 57:
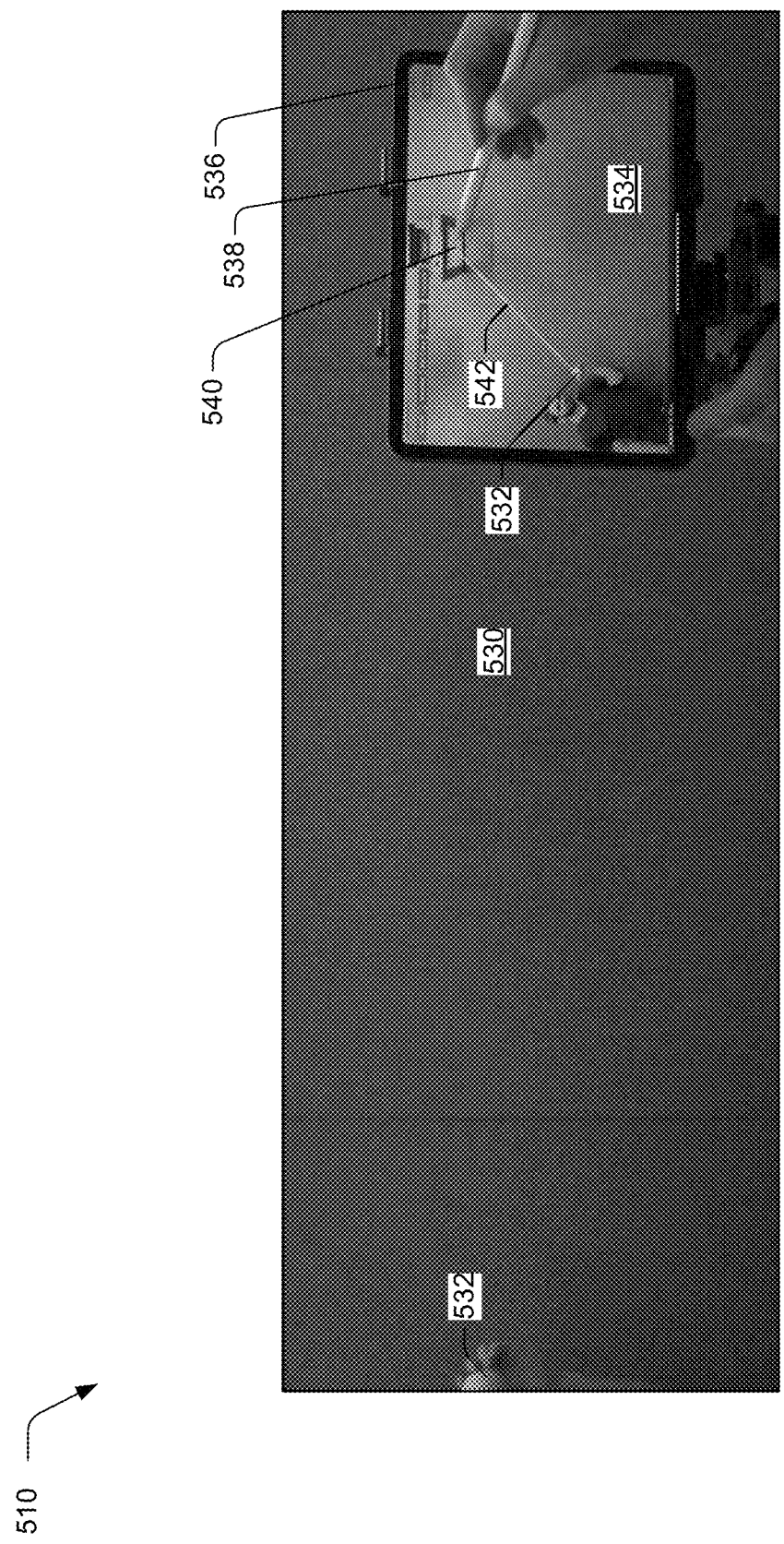
Figure 5G:
Figure 5A:
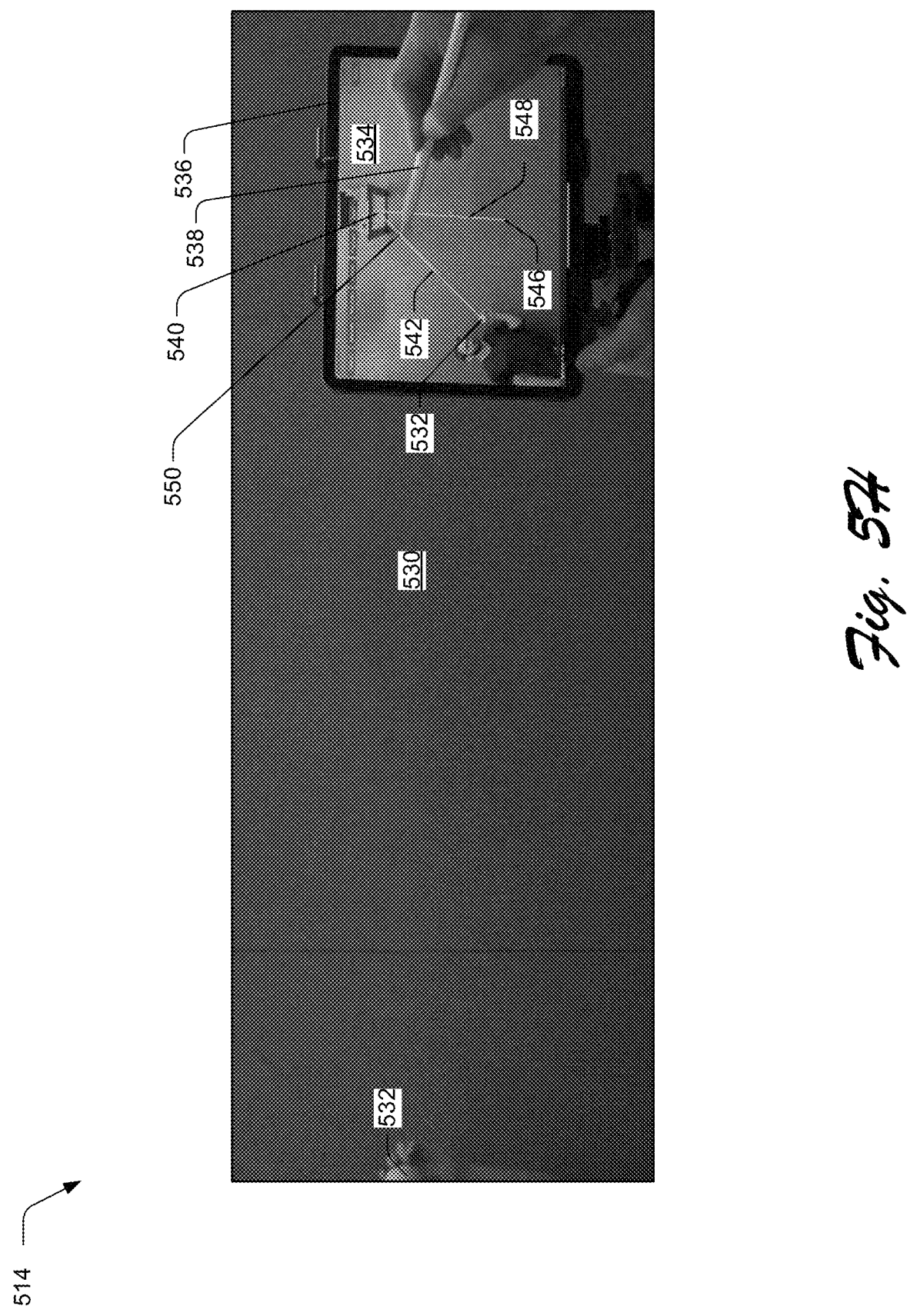
Figure 59:
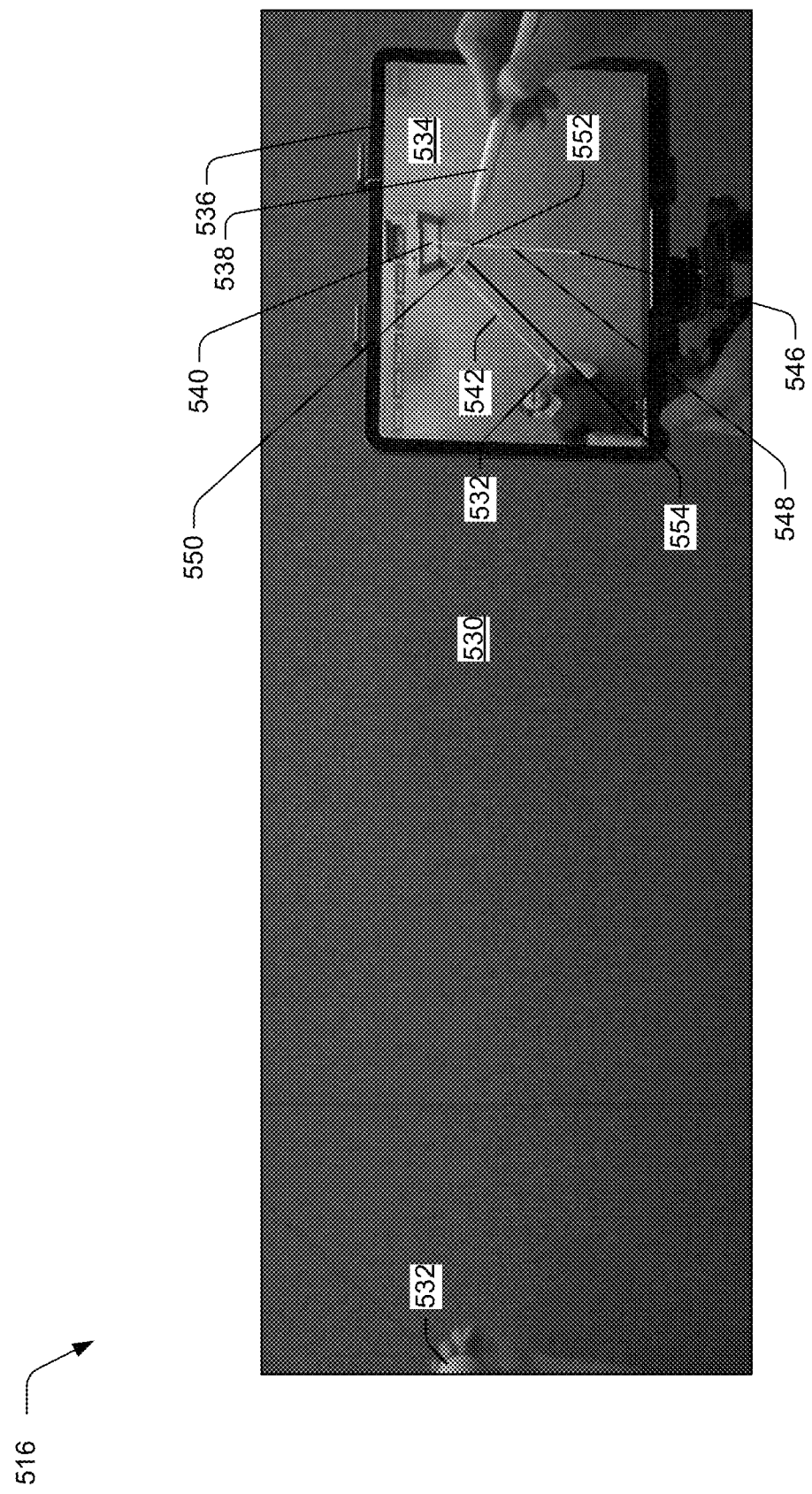
Figure 50:
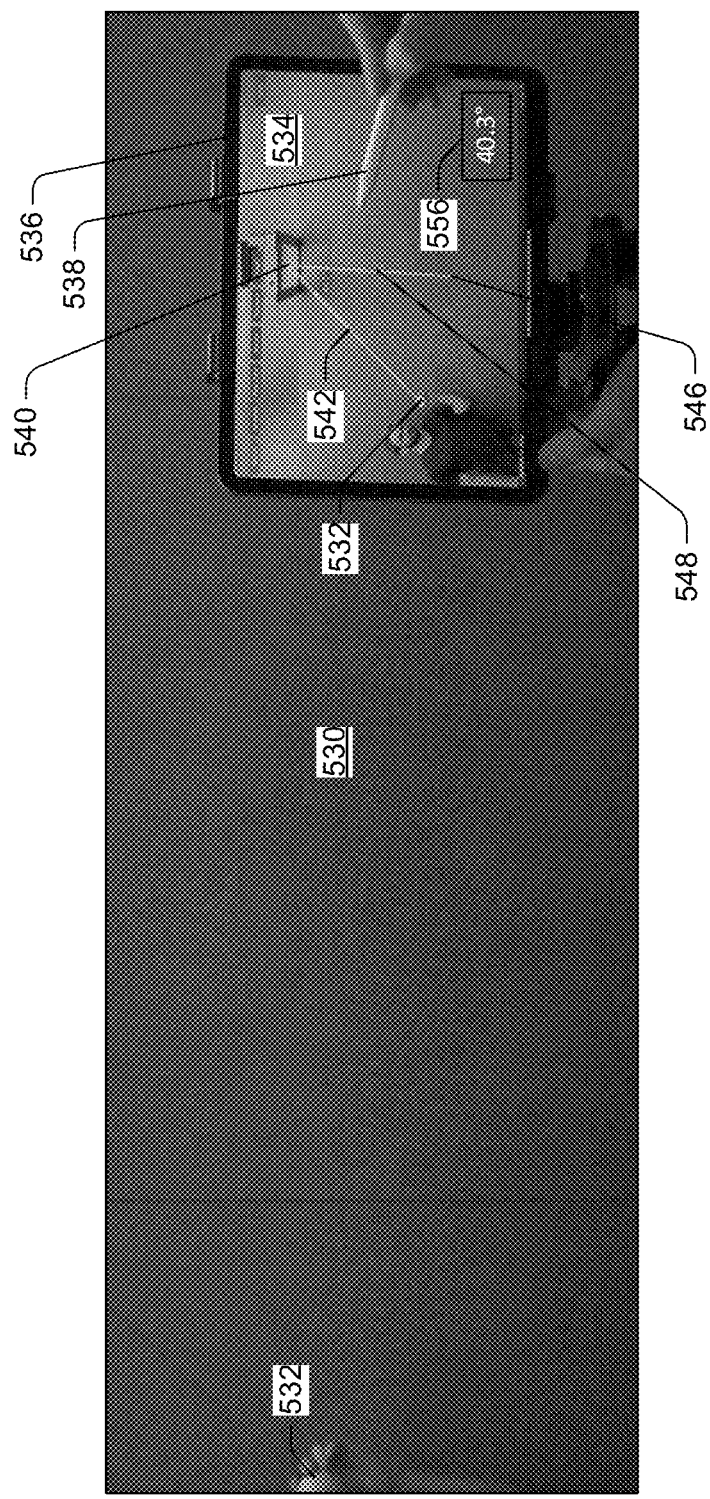

FIGS. 5A, 5B, 5C, 5D, 5E, 5F, 5G, 5H, 5I, 5J, 5K, 5L, 5M, 5N, and 5O illustrate an example of a user interface for augmented reality sketching. FIG. 5A illustrates an example representation 500 of an interaction in a user interface displaying a digital video. FIG. 5B illustrates an example representation 502 of a selection of an object for tracking. FIG. 5C illustrates an example representation 504 of an input defining a start point of a first line segment. FIG. 5D illustrates an example representation 506 of an input defining an endpoint of the first line segment. FIG. 5E illustrates an example representation 508 of the first line segment rendered over the digital video in the user interface. FIG. 5F illustrates an example representation 510 of an input defining a start point of a second line segment. FIG. 5G illustrates an example representation 512 of an input defining an endpoint of the second line segment. FIG. 5H illustrates an example representation 514 of an input defining a start point of an angle. FIG. 5I illustrates an example representation 516 of the angle defined between the first line segment and the second line segment.

Figure 5L:
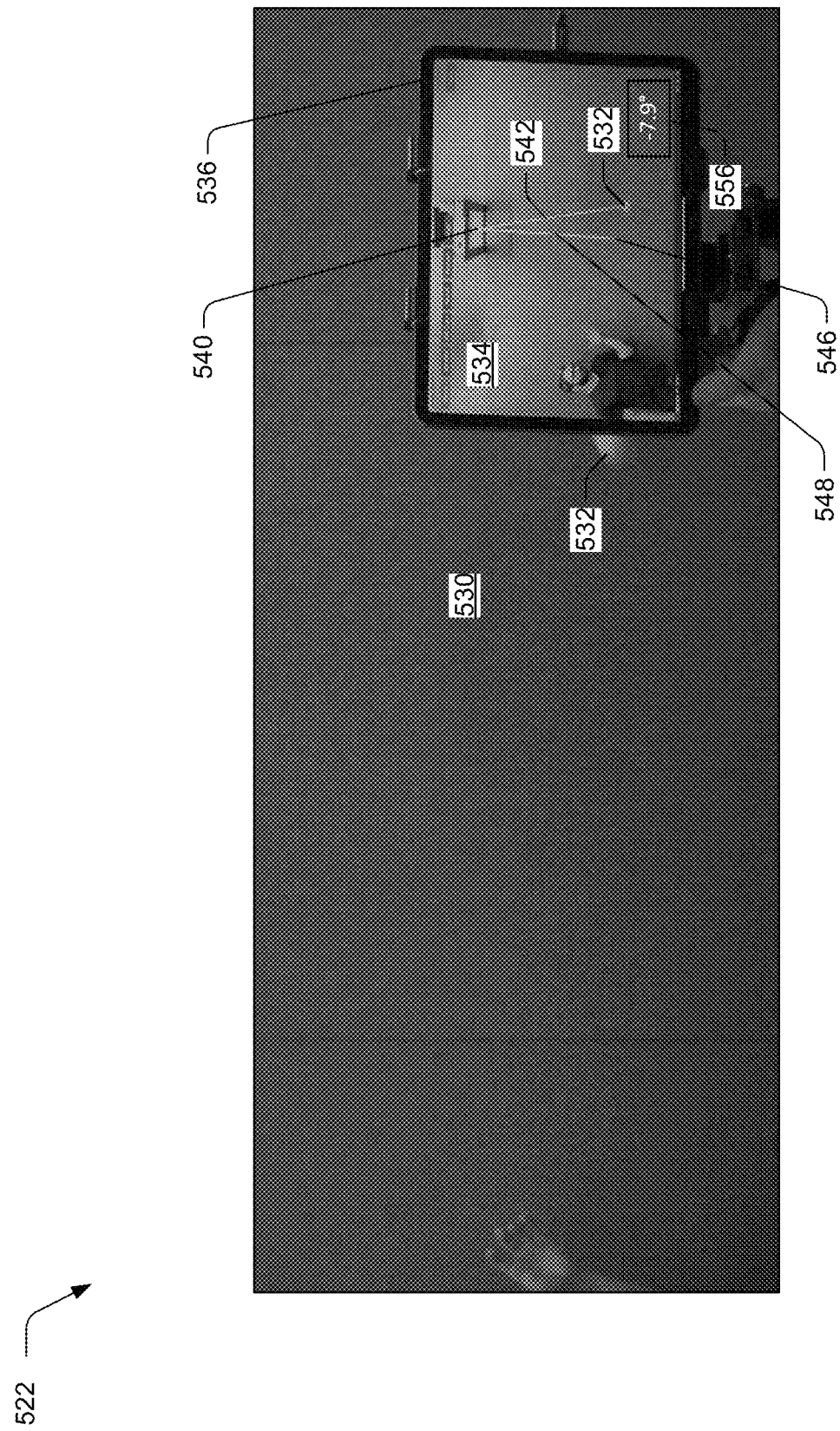
Figure 5M:
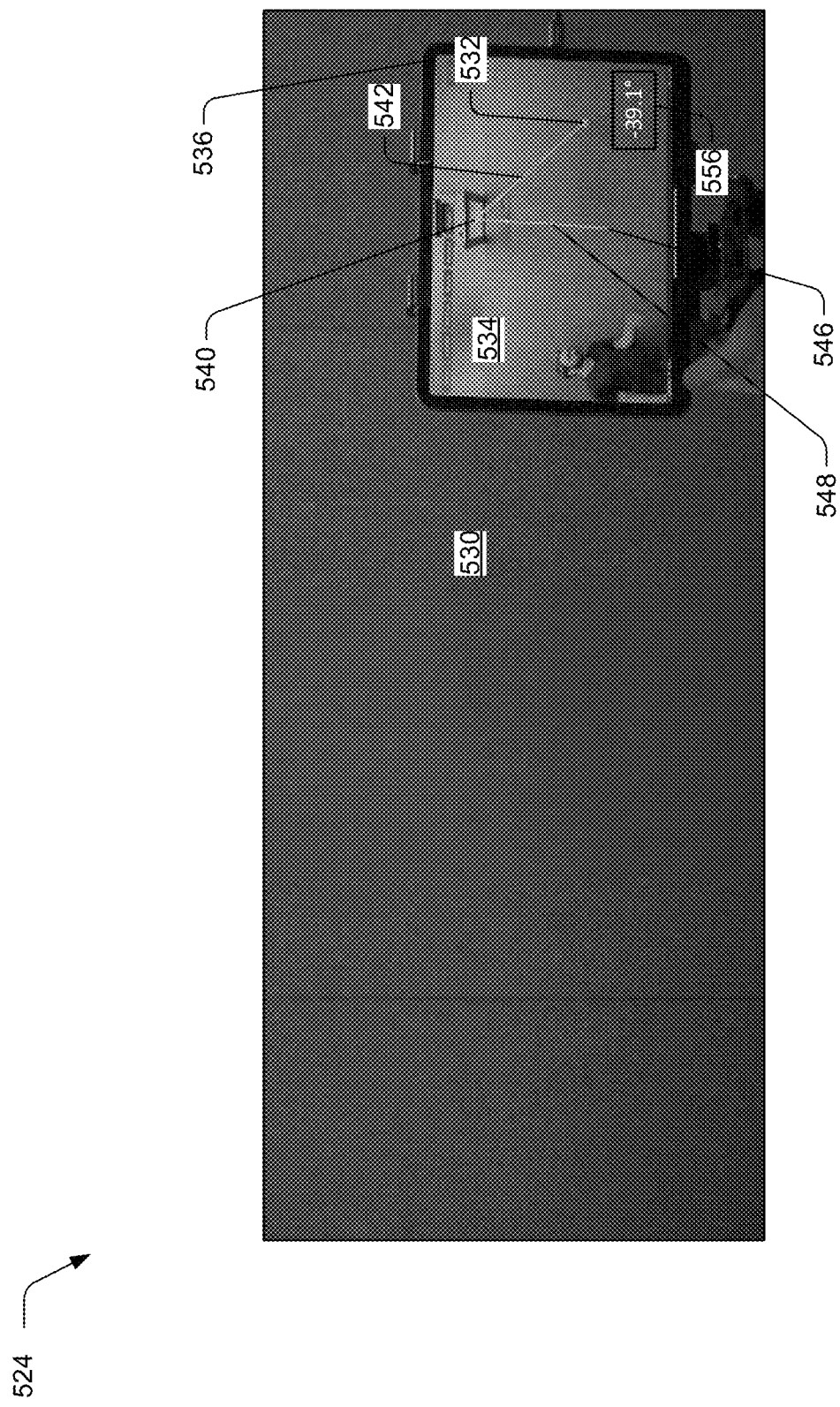
Figure 50:
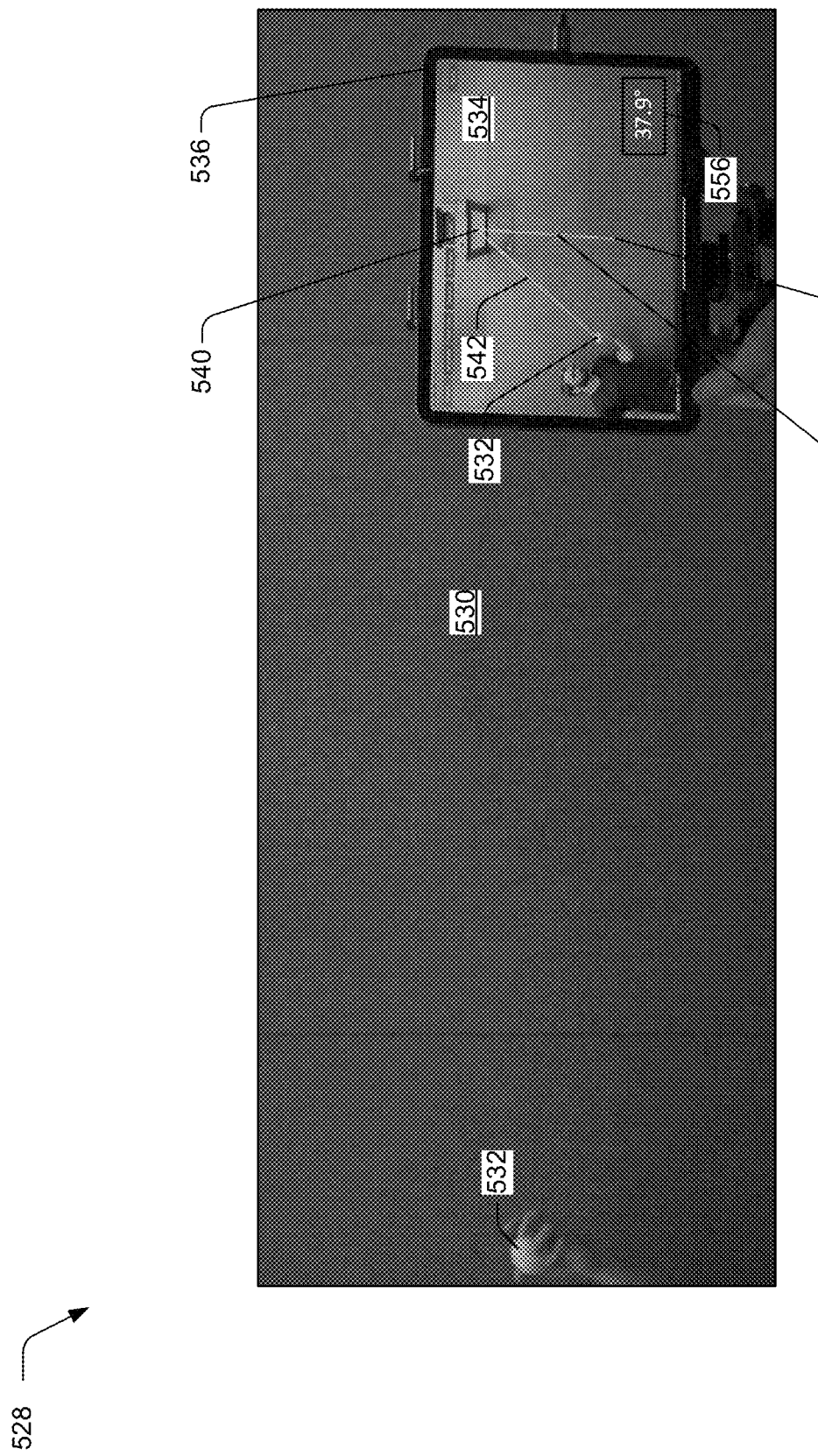

FIG. 5J illustrates an example representation 518 of the tracked object in a first position. FIG. 5K illustrates an example representation 520 of the tracked object in a second position. FIG. 5L illustrates an example representation 522 of the tracked object in a third position. FIG. 5M illustrates an example representation 524 of the tracked object in a fourth position. FIG. 5N illustrates an example representation 526 of the tracked object in a fifth position. FIG. 5O illustrates an example representation 528 of the tracked object in a sixth position.

As shown in FIG. 5A, the representation includes a physical environment 530 and a physical object 532. The physical environment 530 and the physical object 532 are depicted in a digital video 534 displayed in a user interface 536. A user interacts in the user interface 536 using a stylus 538 in this example.

FIG. 5B illustrates the user selecting the physical object 532 for tracking by contacting the depicted physical object 532 in the user interface 536. In an example, the sketch module 118 determines an x-coordinate and a y-coordinate in the user interface 536 corresponding to the contacted portion of the user interface 536. In this example, the sketch module 118 obtains a color value at the position defined by the x-coordinate and the y-coordinate. The sketch module 118 uses the color value to identify and mask similar colors which are used to determine a center position of the physical object 532 as depicted in the digital video 534. In another example, the sketch module 118 tracks the physical object 532 depicted in the digital video 534 using any suitable object tracking technique such as techniques which track objects in digital video frames using a convolution neural network.

As illustrated in FIG. 5C, the user contacts a portion of the user interface 536 to define a start point 540 of a first line segment. As shown in FIG. 5D, the user contacts the physical object 532 depicted in the digital video 534 to define an endpoint of the first line segment. Because the endpoint is connected to the physical object 532 which is being tracked in the digital video 534, the sketch module 118 binds the endpoint to the physical object 532 such that the endpoint moves in the user interface 536 based on movements of the physical object 532 in the physical environment 530. FIG. 5E illustrates the first line segment 542 which has been rendered in the user interface 536 over the digital video 534. A first end of the first line segment 542 is bound to the start point 540 and a second end of the first line segment 542 is bound to the physical object 532 depicted in the digital video 534.

As shown in FIG. 5F, the user contacts the user interface 536 again to define the start point 540 as a start point of a second line segment. Because the start point 540 is also the start point for the first line segment 542, the sketch module 118 binds the start point of the second line segment to the start point of the first line segment 542. The user drags the stylus 538 within the user interface 536 and the sketch module 118 renders a trace 544 of the stylus 538 in the user interface 536 as illustrated by FIG. 5G. For example, the trace 544 allows the user to visualize an orientation of the stylus drag in the user interface 536. The user defines an endpoint 546 of the second line segment in the user interface 536 by raising the stylus 538 in one example.

The representations 514, 516 illustrated in FIGS. 5H and 5I, respectively, include the second line segment 548 which the sketch module 118 has rendered in the user interface 536 over the digital video 534. As shown, the user contacts a portion of the first line segment 542 with the stylus 538 to define a start point 550 of an angle. The user drags the stylus 538 within the user interface 536 and lifts the stylus 538 to define an endpoint 552 of the angle. As shown, the sketch module 118 renders a defined angle 554 in the user interface 536 which will dynamically change based on movements of the physical object 532 within the physical environment 530.

The defined angle 554 will change based on the movements of the physical object 532 because the endpoint of the first line segment 542 is bound to the physical object 532 depicted in the digital video 534. Thus, as the physical object 532 depicted in the digital video 534 moves within the user interface 536, the sketch module 118 causes the endpoint of the first line segment 542 to move based on the movements of the physical object 532. To do so, the sketch module 118 tracks a two-dimensional position of the physical object 532 depicted in the digital video 534 as the depicted physical object 532 moves within the user interface 536. The sketch module 118 projects two-dimensional coordinates of this tracked two-dimensional position into three-dimensional coordinates of a three-dimensional representation of the physical environment 530.

For example, the sketch module 118 casts a ray through the tracked two-dimensional position of the physical object 532 onto a surface of the physical environment 530 used to generate the three-dimensional representation. In this manner, the sketch module 118 uses the same surface of the physical environment 530 used to generate the three-dimensional representation of the physical environment 530 to project the two-dimensional coordinates into the three-dimensional representation. In one example, the sketch module 118 leverages the surface of the physical environment 530 used to generate the three-dimensional representation as an interaction plane for projecting the two-dimensional coordinates into the three-dimensional representation.

The sketch module 118 also projects two-dimensional coordinates of the first line segment 542, the second line segment 548, and the defined angle 554 into the three-dimensional representation of the physical environment 530. In this way, the sketch module 118 embeds the two-dimensional graphical elements sketched in the user interface 536 in the three-dimensional representation of the physical environment 530. Thus, the sketch module 118 can leverage the tracked two-dimensional position of the physical object 532 depicted in the digital video 534 to bind the endpoint of the first line segment 542 to the physical object 532 depicted in the digital video 534 such that the endpoint of the first line segment 542 moves based on movements of the physical object 532. The sketch module 118 can also leverage the three-dimensional representation of the physical environment 530 which includes the projected tracked position of the physical object 532 in the user interface 536, the projected first line segment 542, the projected second line segment 548, and the projected defined angle 554 to determine spatial relationships of the projections relative to the physical environment 530.

FIG. 5J illustrates an indication 556 of the defined angle 554 based on the three-dimensional representation of the physical environment 530. As shown, the physical object 532 is disposed in a first position within the physical environment 530. Because the endpoint of the first line segment 542 is bound to the physical object 532, the endpoint is also disposed in the first position within the user interface 536. The sketch module 118 calculates the defined angle 554 based on an inner product of the projected first line segment 542 and the projected second line segment 548 within the three-dimensional representation of the physical environment 530. As shown, the indication 556 is 40.3 degrees when the physical object 532 is disposed in the first position within the physical environment 530.

As illustrated in FIG. 5K, the physical object 532 is now disposed in a second position within the physical environment 530. Since the endpoint of the first line segment 542 is bound to the physical object 532, the first line segment 542 moves in the user interface 536 as the depicted physical object 532 moves in the digital video 534. The sketch module 118 projects the tracked two-dimensional coordinates of the physical object 532 and the two-dimensional position of the first line segment 542 into the three-dimensional representation of the physical environment 530. The sketch module 118 also calculates the defined angle 554 based on the inner product of the projected first line segment 542 and the projected second line segment 548 within the three-dimensional representation of the physical environment 530. As shown, the indication 556 is 11.1 degrees when the physical object 532 is disposed in the second position within the physical environment 530.

As shown in FIG. 5L, the physical object 532 is now disposed in a third position within the physical environment 530. The sketch module 118 projects the tracked two-dimensional position of the physical object 532 and the two dimensional position of the first line segment 542 into the three-dimensional representation of the physical environment 530. Again, the sketch module 118 also calculates the defined angle 554 based on the inner product of the projected first line segment 542 and the projected second line segment 548 within the three-dimensional representation of the physical environment 530.

As illustrated, the indication 556 is −7.9 degrees when the physical object 532 is disposed in the third position within the physical environment 530. As depicted in the representation 522, the physical object 532 has moved past the second line segment 548 in the user interface 536. Because the defined angle 554 is calculated based on an inner product of a vector representation of the first line segment 542 and a vector representation of the second line segment 548 in the three-dimensional representation, the indication 556 is a negative number when the physical object 532 is disposed in the third position within the physical environment 530.

As illustrated in FIG. 5M, the physical object 532 is disposed in a fourth position within the physical environment 530 (behind the user interface 536). In this example, the physical object 532 has moved further past the second line segment 548 in the user interface 536. Because the endpoint of the first line segment 542 is bound to the physical object 532, the first line segment 542 has also moved further past the second line segment 548. Again, the sketch module 118 projects the tracked two-dimensional coordinates of the physical object 532 and the two-dimensional position of the first line segment 542 into the three-dimensional representation of the physical environment 530. The sketch module 118 also calculates the defined angle 554 based on the inner product of the projected first line segment 542 and the projected second line segment 548 within the three-dimensional representation of the physical environment 530. As illustrated, the indication 556 is −39.1 degrees when the physical object 532 is disposed in the fourth position within the physical environment 530.

FIG. 5N illustrates the representation 526 which shows that the physical object 532 is now disposed in a fifth position within the physical environment 530. In this fifth position, the physical object 532 has moved back in front of the second line segment 548 in the user interface 536. Since the endpoint of the first line segment 542 is bound to the physical object 532, the endpoint is also disposed in the fifth position as depicted in the user interface 536. The sketch module 118 projects the tracked two-dimensional coordinates of the physical object 532 and the two-dimensional position of the first line segment 542 into the three-dimensional representation and calculates the defined angle 554 based on the inner product of the projected first line segment 542 and the projected second line segment 548 within the three-dimensional representation. As shown, the indication 556 is 9.8 degrees when the physical object 532 is disposed in the fifth position within the physical environment 530.

As illustrated by FIG. 5O, the physical object 532 is disposed in a sixth position within the physical environment 532. The sketch module 118 projects the tracked two-dimensional coordinates of the physical object 532 and the two-dimensional position of the first line segment 542 into the three-dimensional representation and calculates the defined angle 554 based on the inner product of the projected first line segment 542 and the projected second line segment 548 within the three-dimensional representation. As shown, the indication 556 is 37.9 degrees when the physical object 532 is disposed in the sixth position within the physical environment 530.

A comparison of the representation 528 and the representation 518 indicates that the sixth position within the physical environment 530 is near the first position within the physical environment 530. For example, the indication 556 is 40.3 degrees when the physical object 532 is disposed in the first position and the indication 556 is 37.9 degrees when the physical object 532 is disposed in the sixth position. By tracking the two-dimensional position of the physical object 532 depicted in the digital video 534 and projecting both the tracked two-dimensional position of the physical object 532 and the two-dimensional positions of the first line segment 542 and the second line segment 548 into the three-dimensional representation of the physical environment 530, the sketch module 118 is capable of displaying the indication 556 in substantially real time as the physical object 532 moves within the physical environment 330.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

Figure 6:
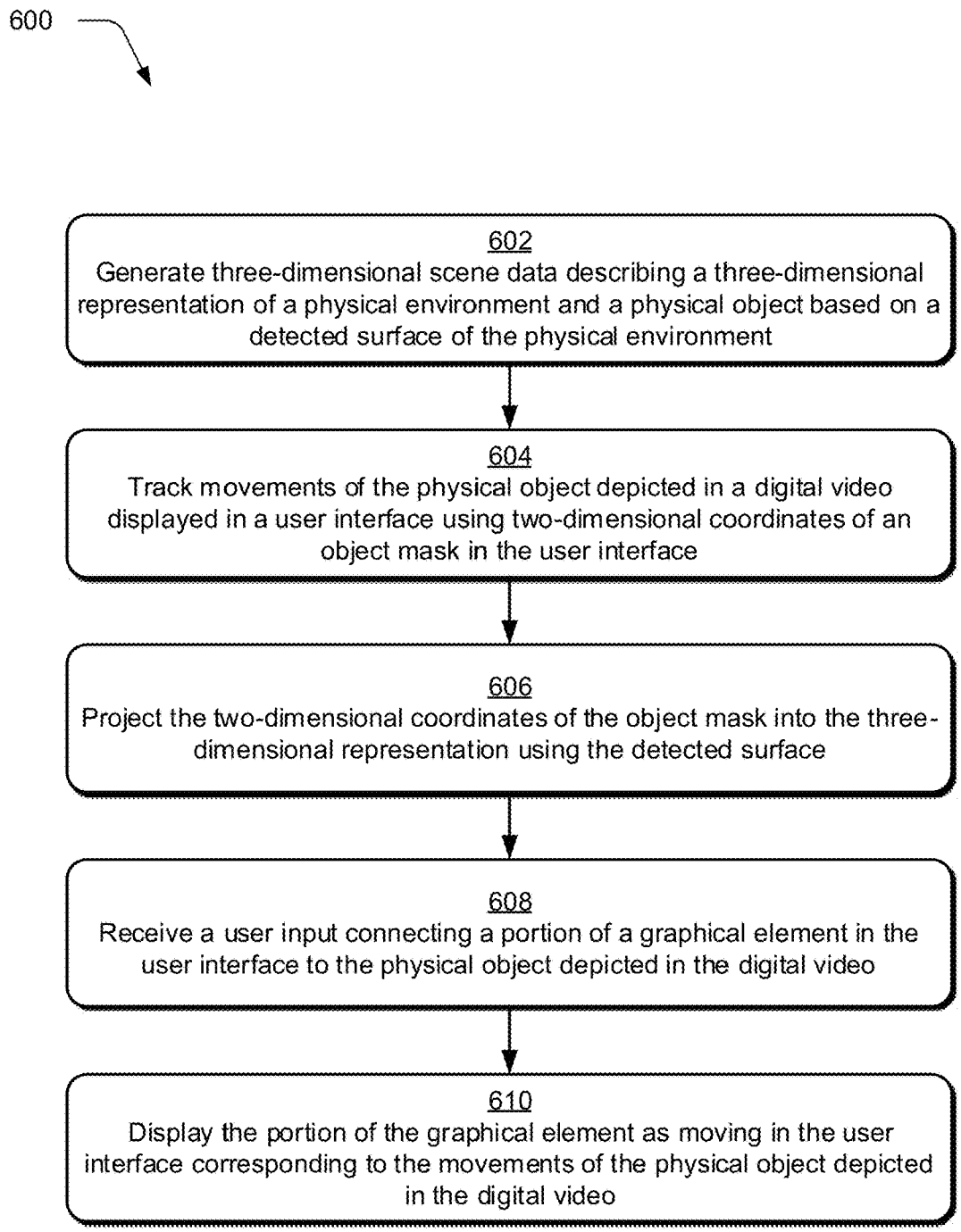
FIG. 6 is a flow diagram depicting a procedure in an example implementation in which a user input is received connecting a portion of a graphical element sketched in a user interface to a physical object depicted in a digital video, and the portion of the graphical element is displayed as moving in the user interface corresponding to movements of the physical object depicted in the digital video.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-5. FIG. 6 is a flow diagram depicting a procedure 600 in an example implementation in which a user input is received connecting a portion of a graphical element in a user interface to a physical object depicted in a digital video, and the portion of the graphical element is displayed as moving in the user interface corresponding to movements of the physical object depicted in the digital video. Three-dimensional scene data describing a three-dimensional representation of a physical environment and a physical object is generated based on a detected surface of the physical environment (block 602). The computing device 102 implements the sketch module 118 to generate the three-dimensional scene data in one example.

Movements of the physical object depicted in a digital video displayed in a user interface are tracked using two-dimensional coordinates of an object mask in the user interface (block 604). For example, the sketch module 118 tracks movements of the physical object depicted in the digital video. The two-dimensional coordinates of the object mask are projected into the three-dimensional representation using the detected surface (block 606). The sketch module 118 can project the two-dimensional coordinates of the object mask into the three-dimensional representation. In one example, the sketch module 118 projects the two-dimensional coordinates into the three-dimensional representation by ray casting a two-dimensional position defined by the two-dimensional coordinates onto the detected surface.

A user input connecting a portion of a graphical element sketched in the user interface to the physical objected depicted in the digital video is received (block 608). In one example, the computing device 102 implements the sketch module 118 to dynamically bind the portion of the graphical element to the physical object depicted in the digital video based on the user input. The portion of the graphical element is displayed (block 610) as moving in the user interface corresponding to the movements of the physical object depicted in the digital video. The sketch module 118 can display the graphical element as moving in the user interface corresponding to the movements of the physical object depicted in the digital video.

Figure 7A:
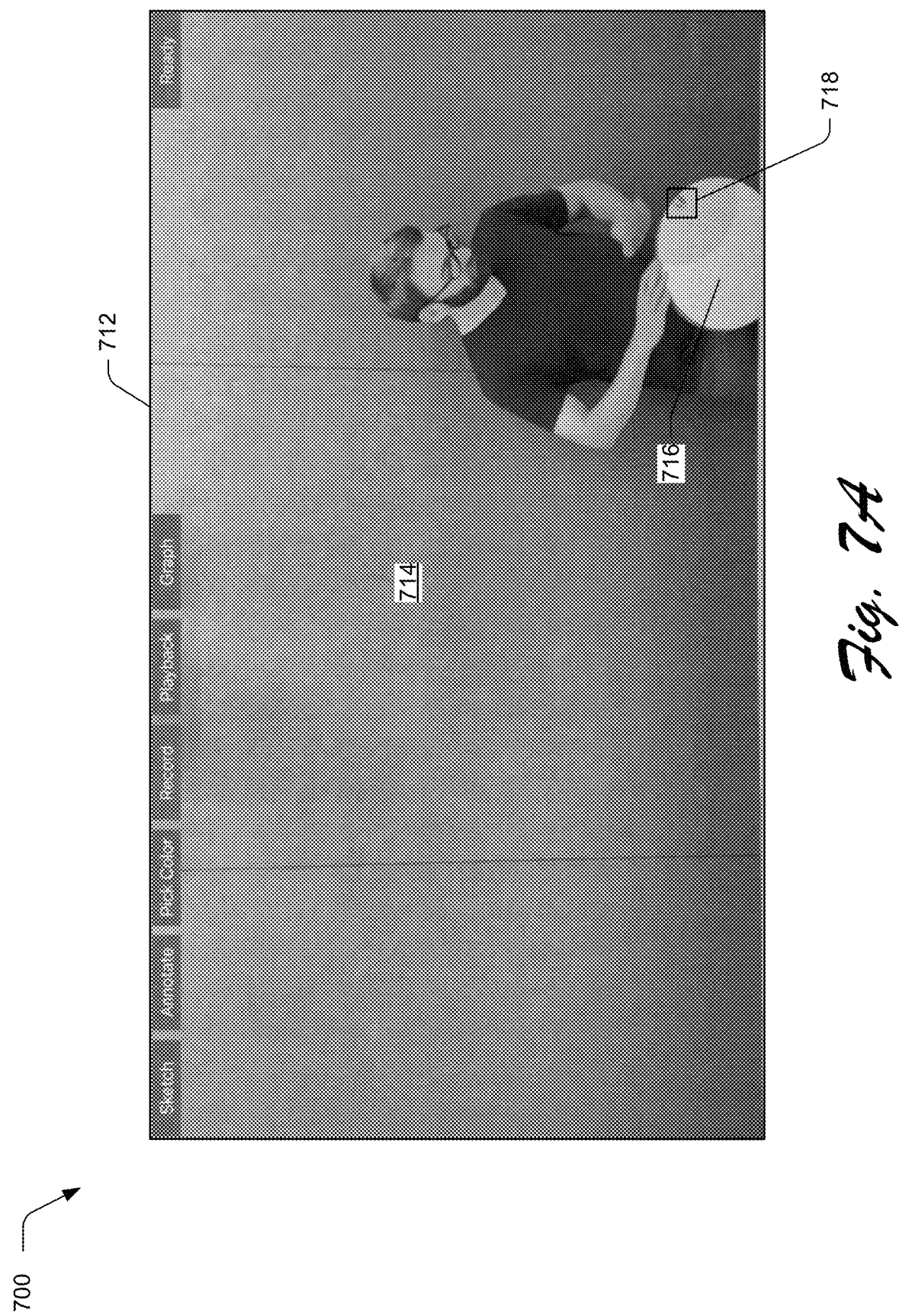
Figure 7B:
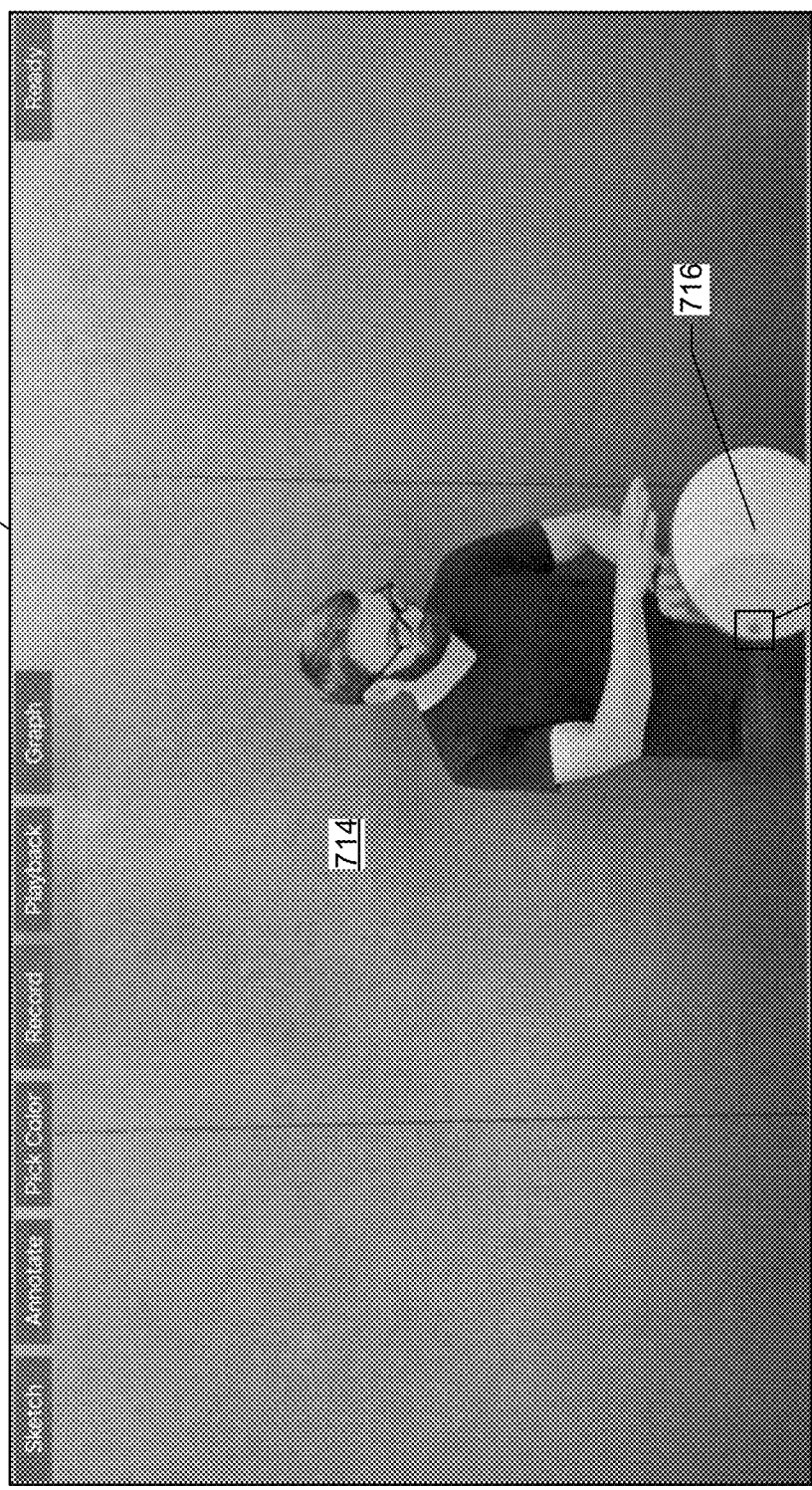
Figure 7C:
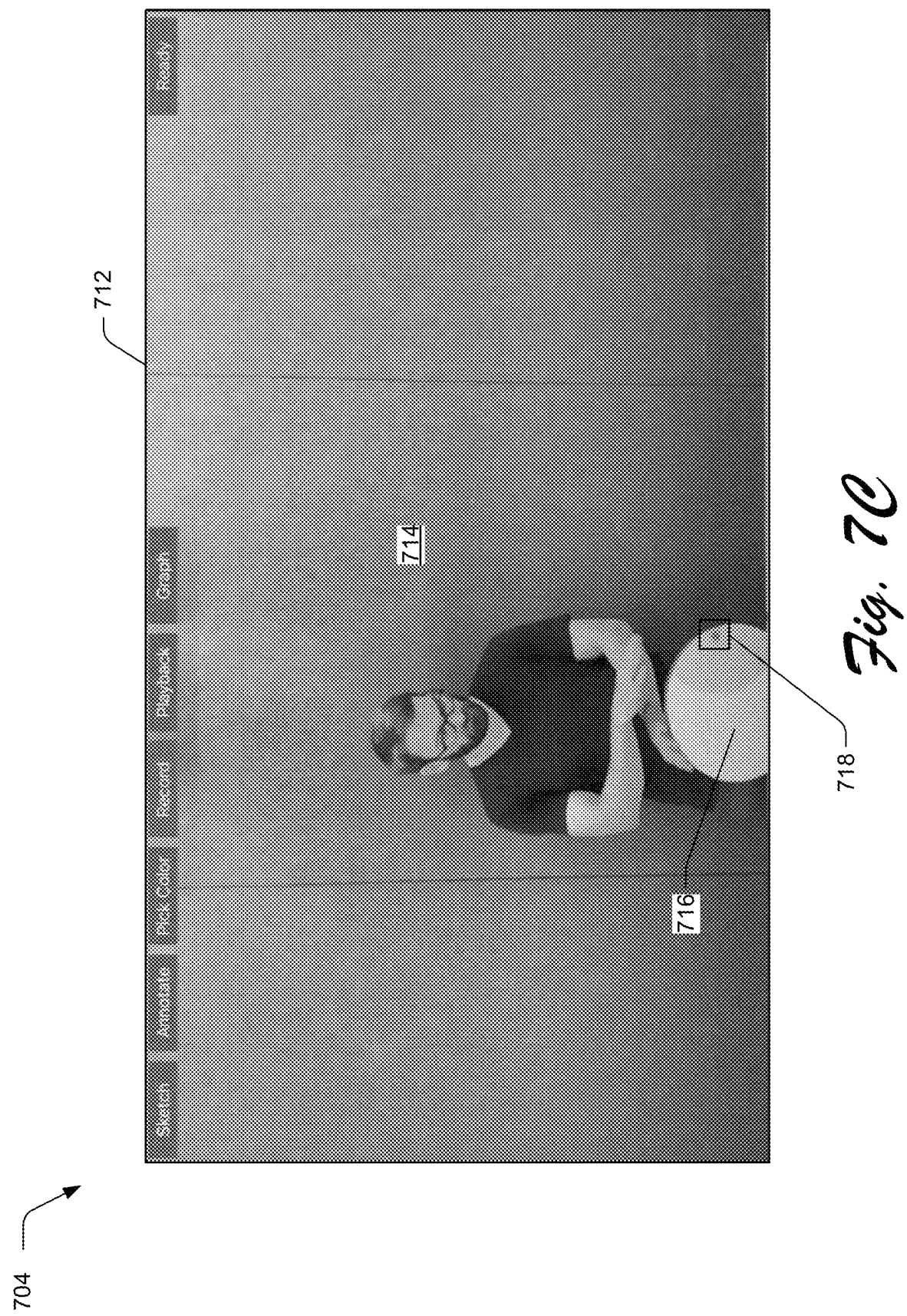
Figure 7D:
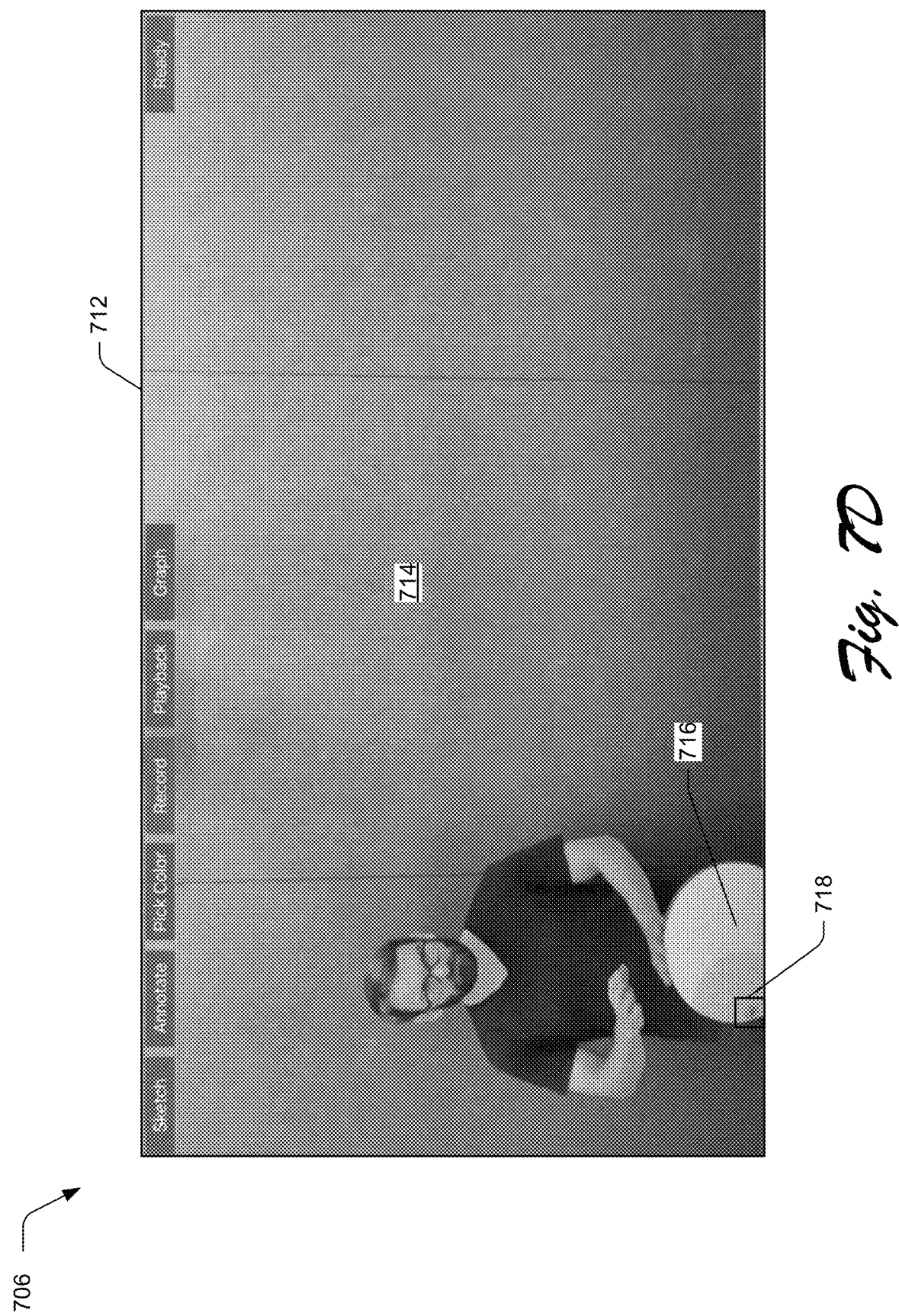
Figure 7E:
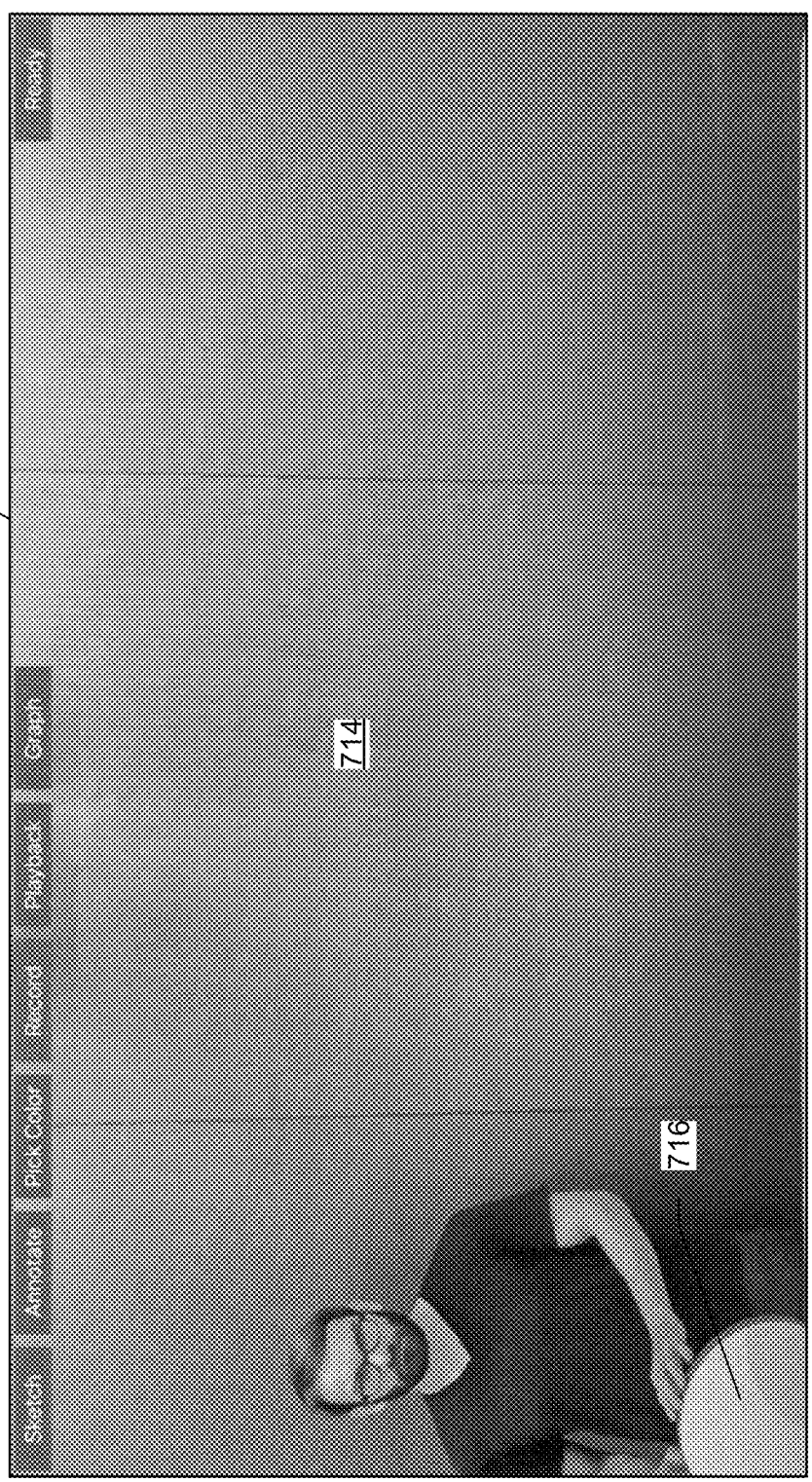
Figure 77:
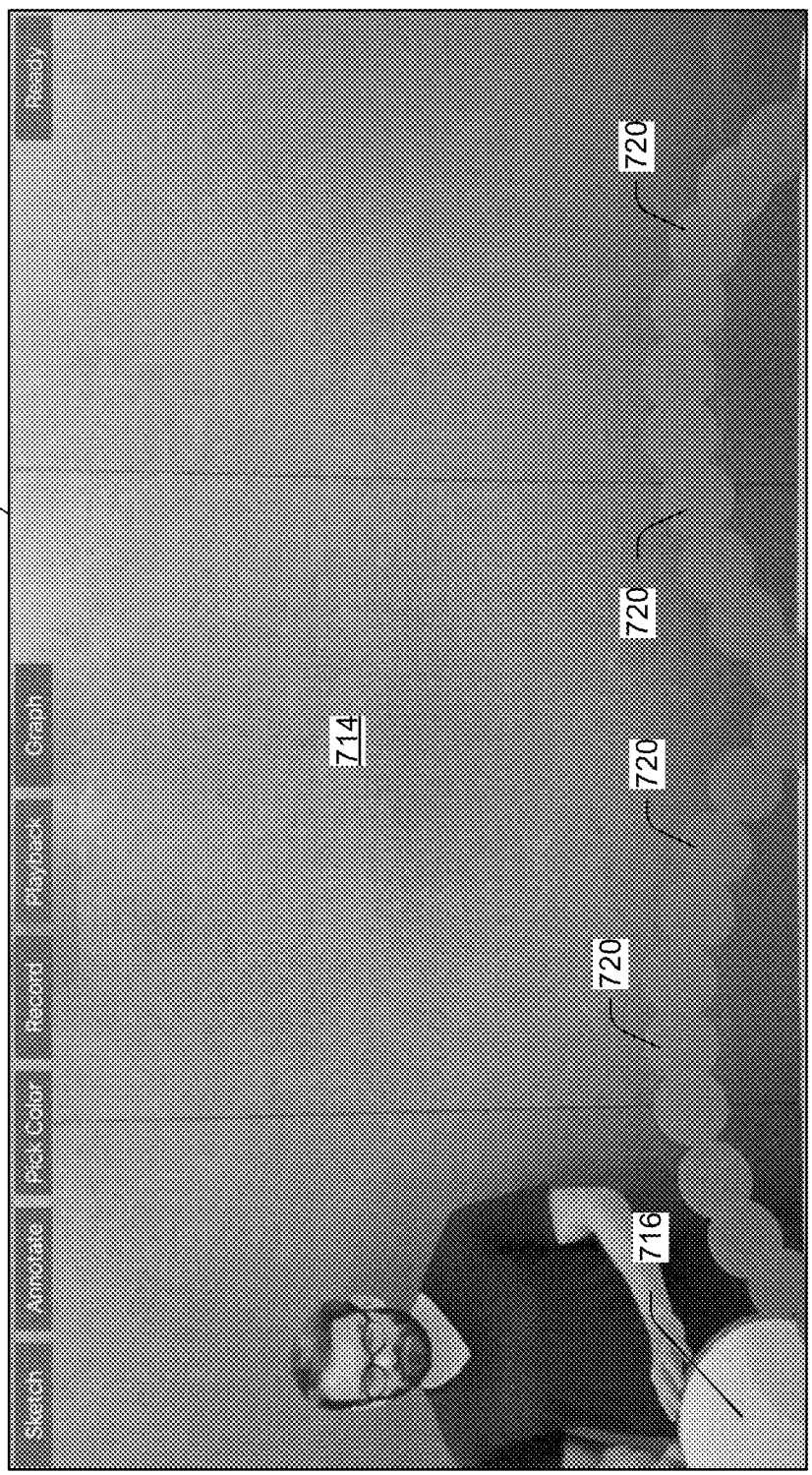

FIGS. 7A, 7B, 7C, 7D, 7E, and 7F illustrate an analysis of a recorded motion of a physical object. FIG. 7A illustrates a representation 700 of a frame of a digital video depicting the physical object in a first rotational orientation. FIG. 7B illustrates a representation 702 of a frame of the digital video depicting the physical object in a second rotational orientation. FIG. 7C illustrates a representation 704 of a frame of the digital video depicting the physical object in a third rotational orientation. FIG. 7D illustrates a representation 706 of a frame of the digital video depicting the physical object in a fourth rotational orientation. FIG. 7E illustrates a representation 708 of a frame of the digital video depicting the physical object in a fifth rotational orientation. FIG. 7F illustrates a representation 710 of a frame of the digital video depicting a trajectory of a portion of the physical object.

As shown in FIG. 7A, the representation 700 illustrates a digital video 712 depicting a physical environment 714 and a physical object 716. For example, the physical object 716 is a flat cylinder that is similar to a wheel and the physical object 716 includes a tracked portion 718. In one example, the sketch module 118 tracks the tracked portion 718 in the digital video 712 based on a visual feature of the tracked portion 718 such as a color of the tracked portion 718. In another example, the sketch module 118 tracks the tracked portion 718 in the digital video 712 using a convolutional neural network and a region proposal network. It is to be appreciated that the sketch module 118 may implement any suitable object tracking technique to track the tracked portion 718 in the digital video 712.

As illustrated in FIG. 7B, the physical object 716 is rotated within the physical environment 714 from the first rotational orientation to the second rotational orientation. As the physical object 716 rotates within the physical environment 714, the physical object 716 also actuates within the physical environment 714. Thus, the tracked portion 718 of the physical object 716 rotates and actuates within the physical environment 714. The sketch module 118 records positions of the tracked portion 718 of the physical object 716 in a three-dimensional representation of the physical environment 714. Each recorded position of the tracked portion 718 of the physical object 716 is stored in an array of three-dimensional positions within the three-dimensional representation of the physical environment 714.

As shown in FIG. 7C, the physical object 716 is rotated and actuated within the physical environment 714 from the second rotational orientation to the third rotational orientation. The sketch module 118 records a position of the tracked portion 718 in the third rotational orientation in the array of three-dimensional positions. As the physical object 716 continues to rotate within the physical environment 714, the physical object 716 also continues to actuate within the physical environment 714.

FIG. 7D illustrates the physical object 716 rotated and actuated from the third rotational orientation to the fourth rotational orientation. The computing device 102 implements the sketch module 118 to record a position of the tracked portion 118 in the fourth rotation orientation. The sketch module 118 records this position in the array of three-dimensional positions in this example. FIG. 7E illustrates the physical object 716 rotated and actuated within the physical environment 714 from the fourth rotational orientation to the fifth rotational orientation. The sketch module 118 records a position of the tracked portion 718 in the fifth rotational orientation in the array of three-dimensional positions.

As shown in FIG. 7F, the sketch module 118 renders graphical elements 720 over the recorded positions of the tracked portion 718. In one example, the sketch module 118 renders the graphical elements 720 over a frame of the digital video 712. In this way, the graphical elements 720 illustrate a trajectory of the tracked portion 718 of the physical object 716 as the physical object 716 is rotated and actuated within the physical environment 714. In the illustrated example, orientations of the graphical elements 720 indicate that the tracked portion 718 is being both actuated and rotated within the physical environment 714. This is because the graphical elements 720 depict a rotational motion and a directional motion within the physical environment 714.

Figure 8A:
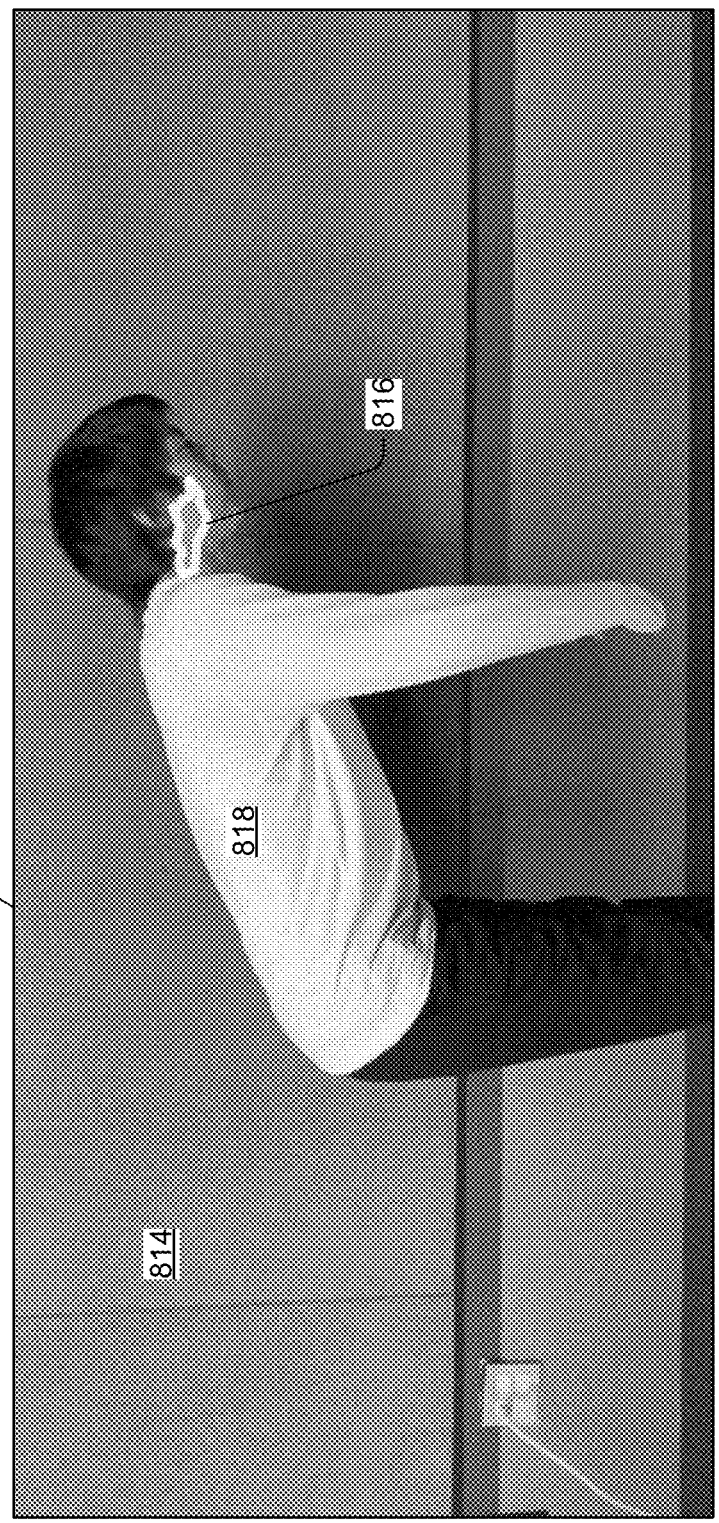
FIGS. 8A, 8B, 8C, 8D, 8E, and 8F illustrate an example of binding sketched graphical elements to body joints for analysis of body motion.
Figure 8B:
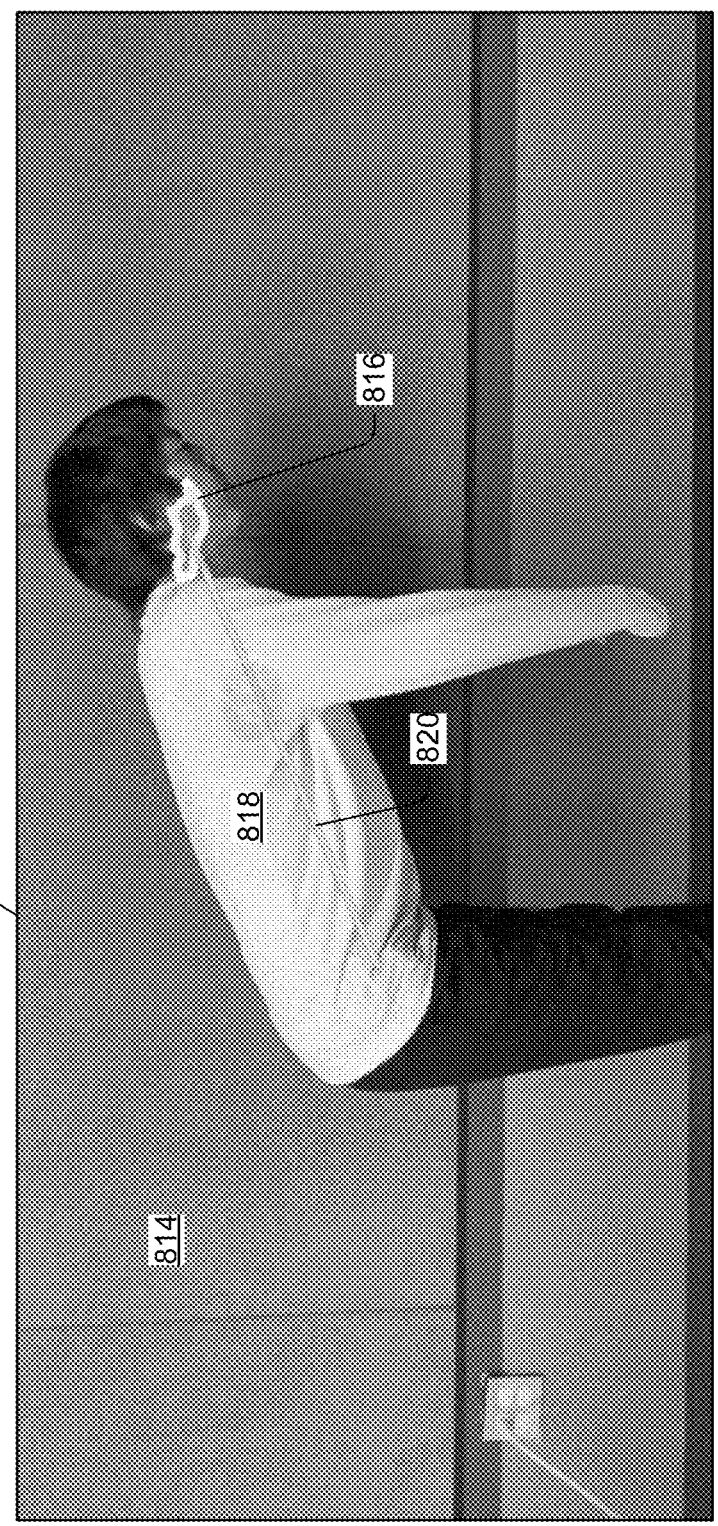
Figure 8C:
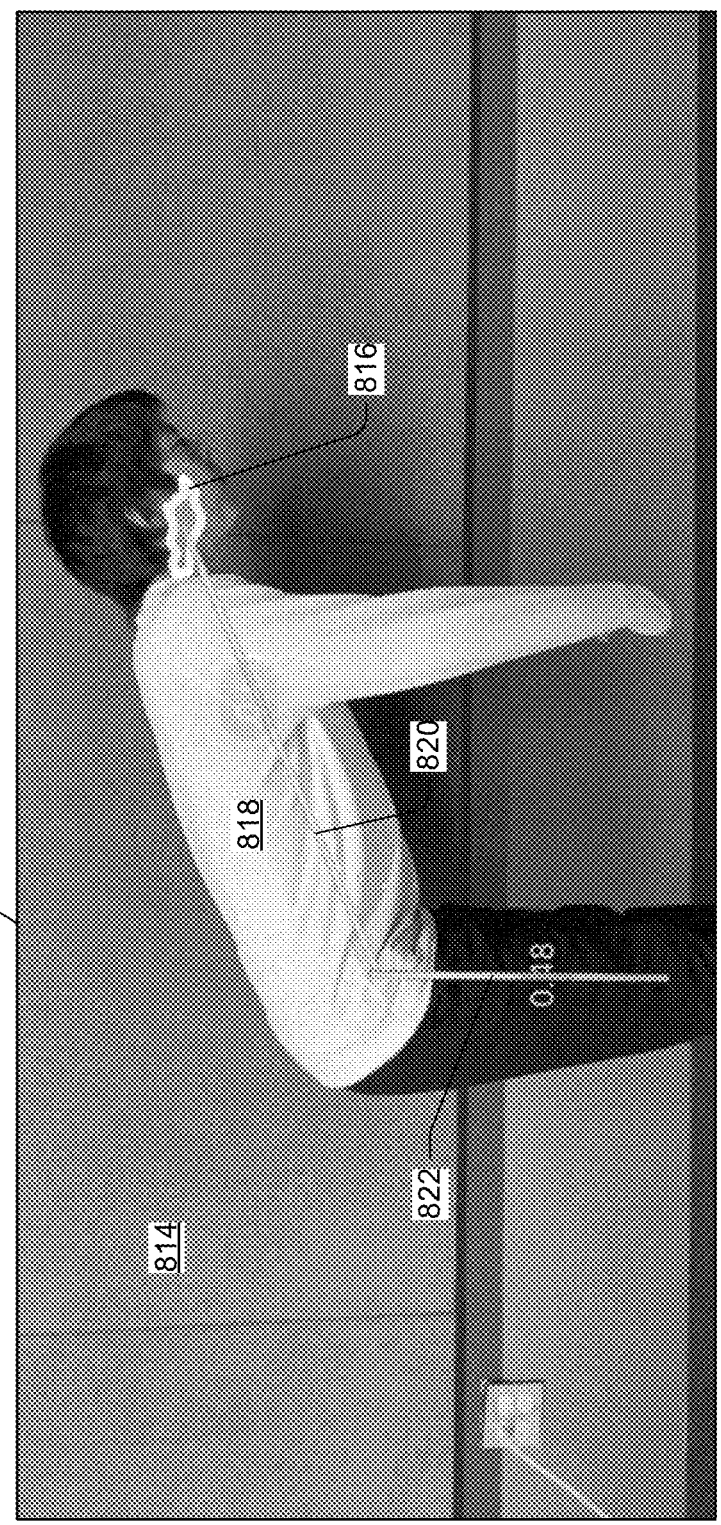
Figure 8D:
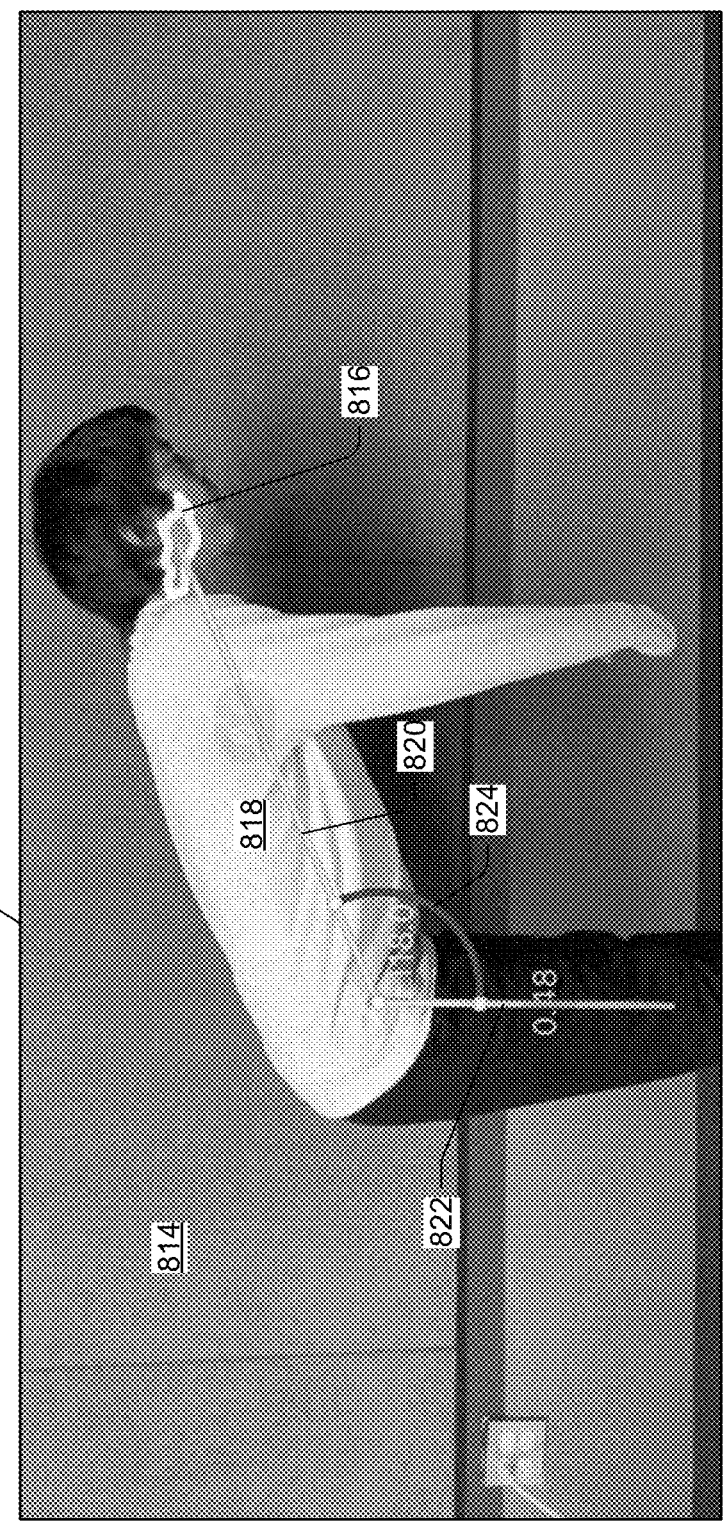
Figure 8S:
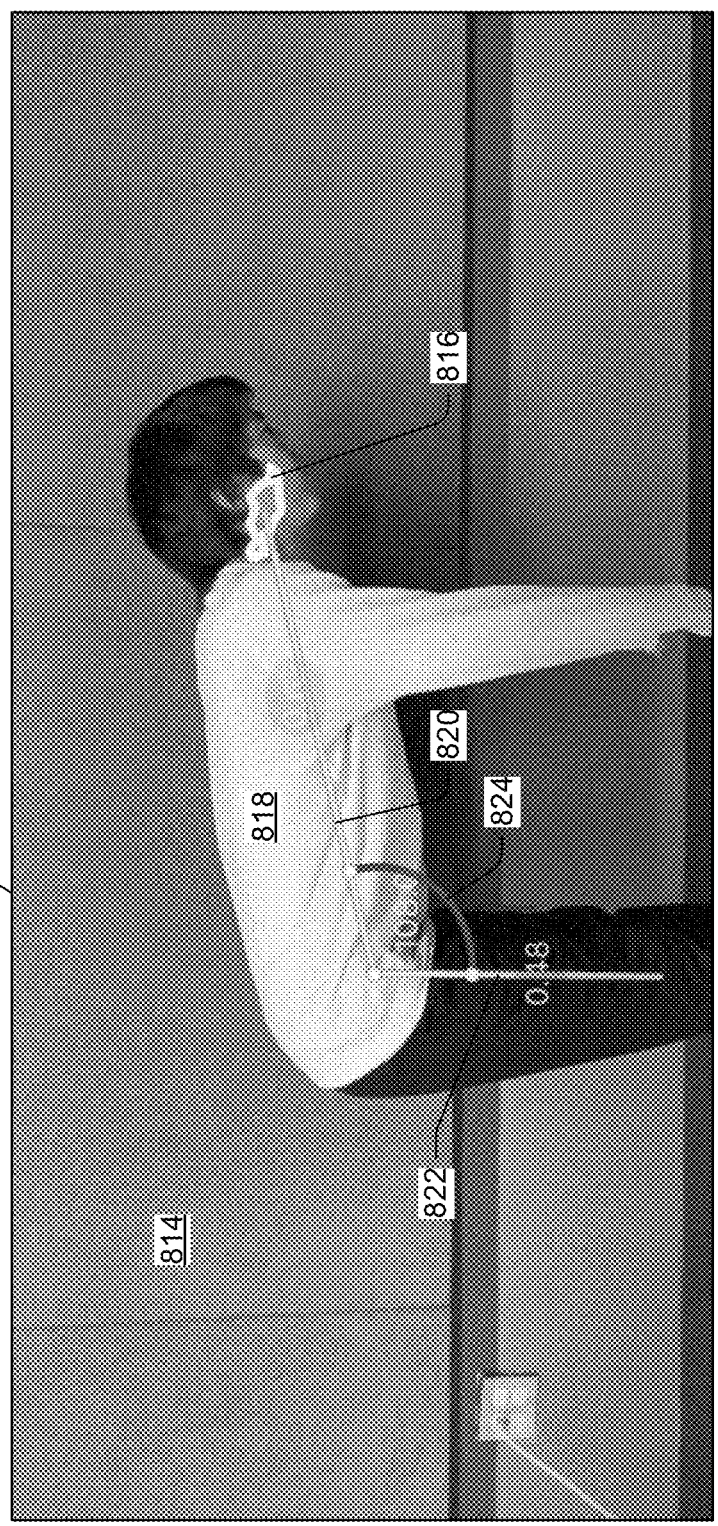
Figure 87:
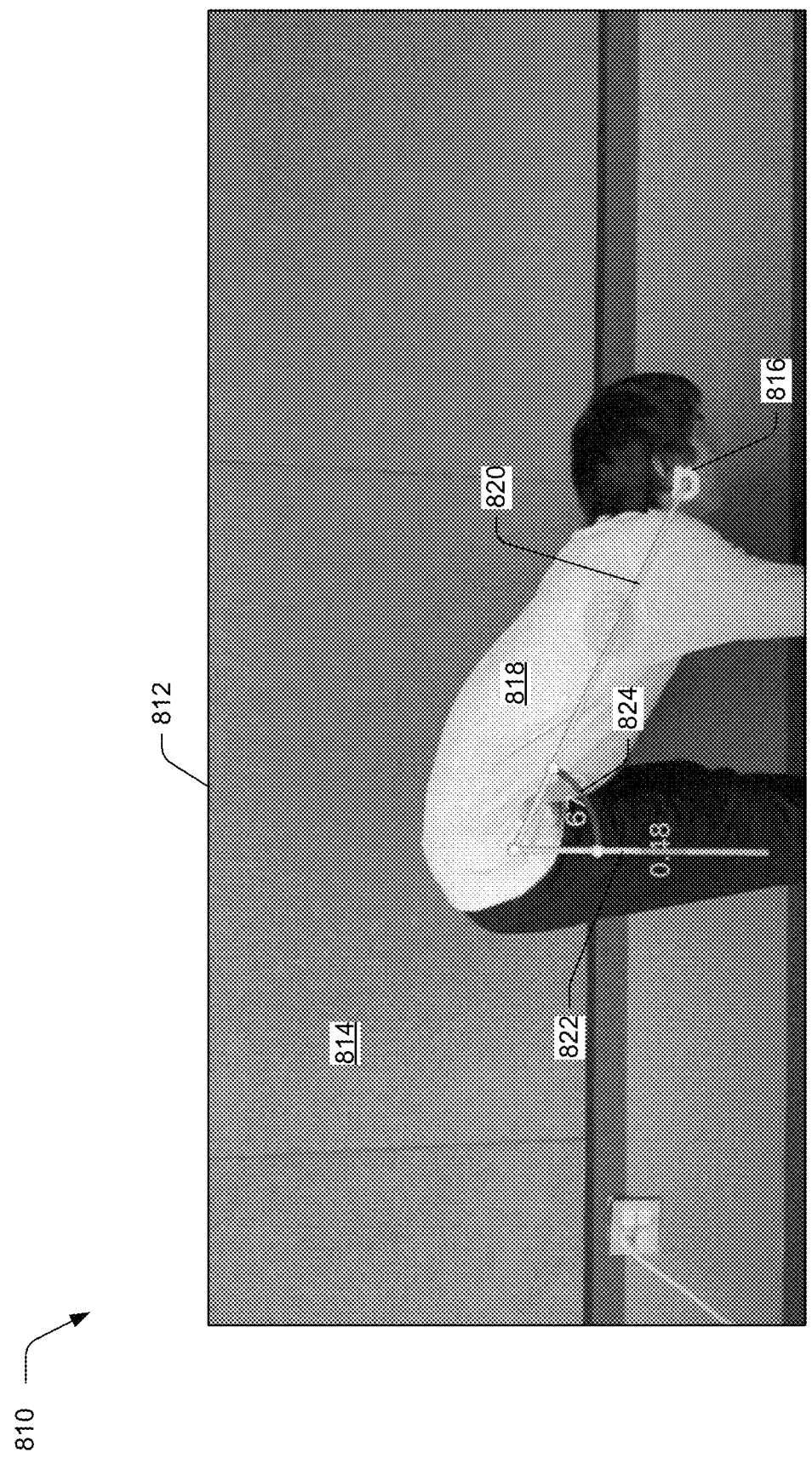

FIGS. 8A, 8B, 8C, 8D, 8D, and 8F illustrate an example of binding sketched graphical elements to body joints for analysis of body motion. FIG. 8A illustrates a representation 800 of a human body for motion tracking. FIG. 8B illustrates a representation 802 of a first graphical element sketched over the human body. FIG. 8C illustrates a representation 804 of a second graphical element sketched over the human body. FIG. 8D illustrates a representation 806 of a third graphical element sketched to define an angle between the first graphical element and the second graphical element. FIG. 8E illustrates a representation 808 of a first tracked motion of the human body. FIG. 8F illustrates a representation 810 of a second tracked motion of the human body.

As shown in FIG. 8A, the representation 800 includes a digital video 812 depicting a physical environment 814. The digital video 812 also depicts a reference object 816 for tracking in the digital video. The physical environment 814 includes a human body 818 which is illustrated as performing a movement of flexion about a waist of the human body 818 in a sagittal plane within the physical environment 814. FIG. 8B illustrates a first graphical element 820 sketched over the digital video 812. As shown, the first graphical element 820 has a first end connected to the reference object

816. Because the reference objects 816 is being tracked in the digital video, the sketch module 118 binds the first end of the graphical element 820 to the reference object 816 such that the first end of the graphical element 820 moves in the digital video 812 based on movements of the reference object 816 in the digital video 812. A second end of the graphical element 820 is disposed approximately at the waist of the human body 818.

As illustrated in FIG. 8C, the representation 804 includes a second graphical element 822 sketched over the digital video 812. The second graphical element 822 has a first end bound to a second end of the first graphical element 820. A second end of the second graphical element 822 is disposed approximately at a knee of the human body 818. The second end of the second graphical element 822 is bound or fixed to the human body 818 in the illustrated example.

As shown in FIG. 8D, a defined angle 824 has been sketched between the first graphical element 820 and the second graphical element 822. The defined angle 824 is dynamic and will change based on movement of the human body 818 within the physical environment 814. The defined angle 824 will change in this way because the first end of the first graphical element 820 is bound to the reference object 816 which is bound to the human body 818. Thus, the first end of the first graphical element 820 moves based on movements of the reference object 816 and the reference object 816 moves based on movements of the human body 818. As shown, an indication of 118.0 degrees is displayed over the digital video 812. Thus, as depicted in the representation 806, the defined angle 824 is a 118.0 degree angle.

FIG. 8E illustrates the representation 808 which shows the human body 818 has increased the movement of flexion about the waist in the sagittal plane within the physical environment 814. This further movement of flexion moves the reference object 816 closer to the second graphical element 822. As shown, the first end of the first graphical element 820 is bound to the reference object 816 which is rendered over the digital video 812. Thus, the movement of the reference object 816 causes movement of the first end of the first graphical element 820. As illustrated, an indication of 108.0 degrees is displayed over the digital video 812. Accordingly, movement of the first graphical element 820 reduces the defined angle 824 by approximately 10.0 degrees.

As shown in FIG. 8F, the human body 818 has further increased the movement of flexion about the waist in the sagittal plane within the physical environment 814. The further movement of the human body 818 causes further movement of the reference objet 816. Because the first end of the first graphical element 820 is bound to the reference object 816 in this example, movement of the reference object 816 moves the first graphical element 820 which decreases the defined angle 824. As shown, an indication of 67.0 degrees is displayed over the digital video 812. Accordingly, the defined angle 824 is a 67.0 degree angle in the representation 810.

Figure 9A:
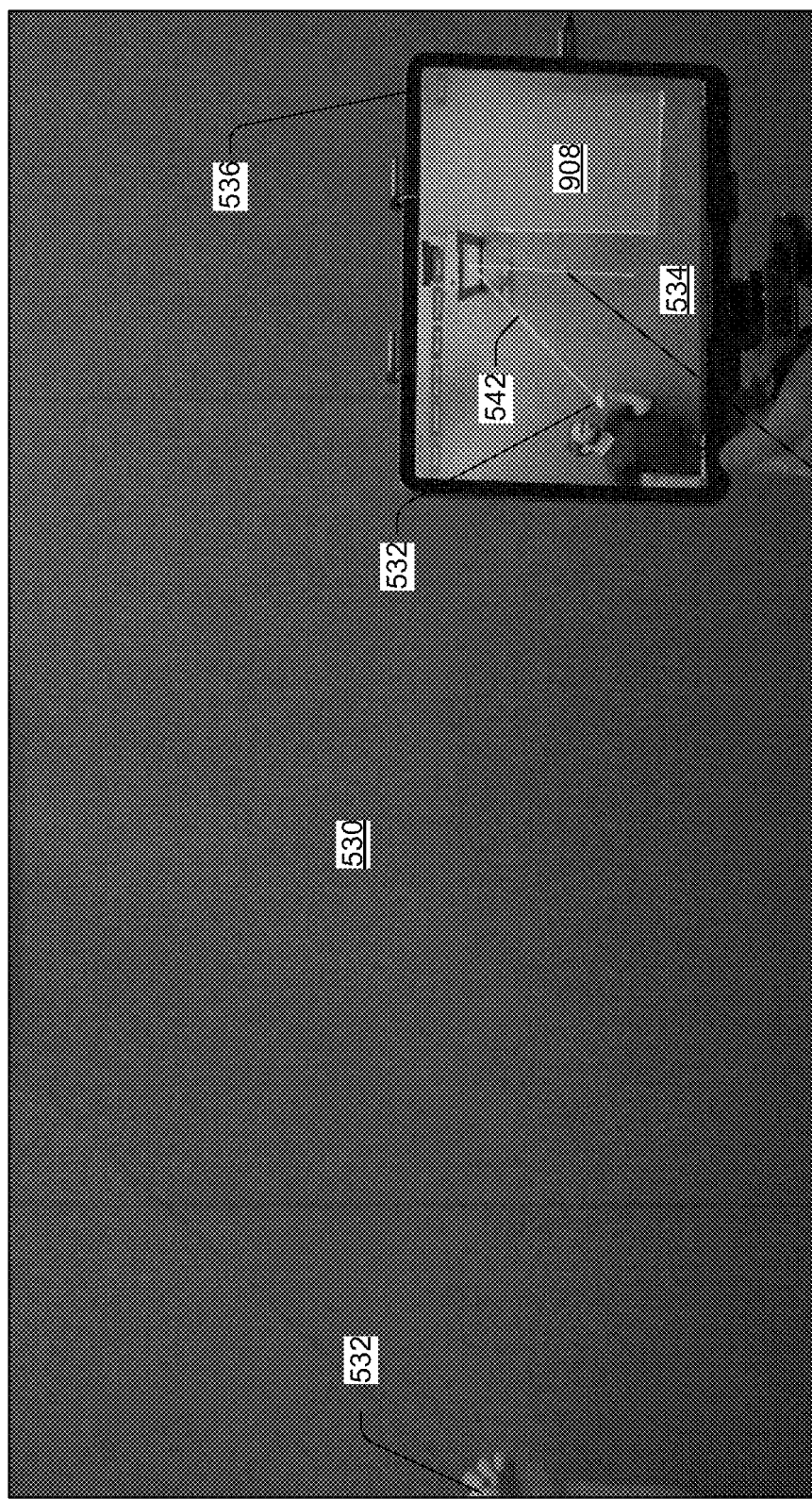
FIGS. 9A, 9B, 9C, and 9D illustrate an example of a two-dimensional graph for visualizing a defined angle.
Figure 9B:
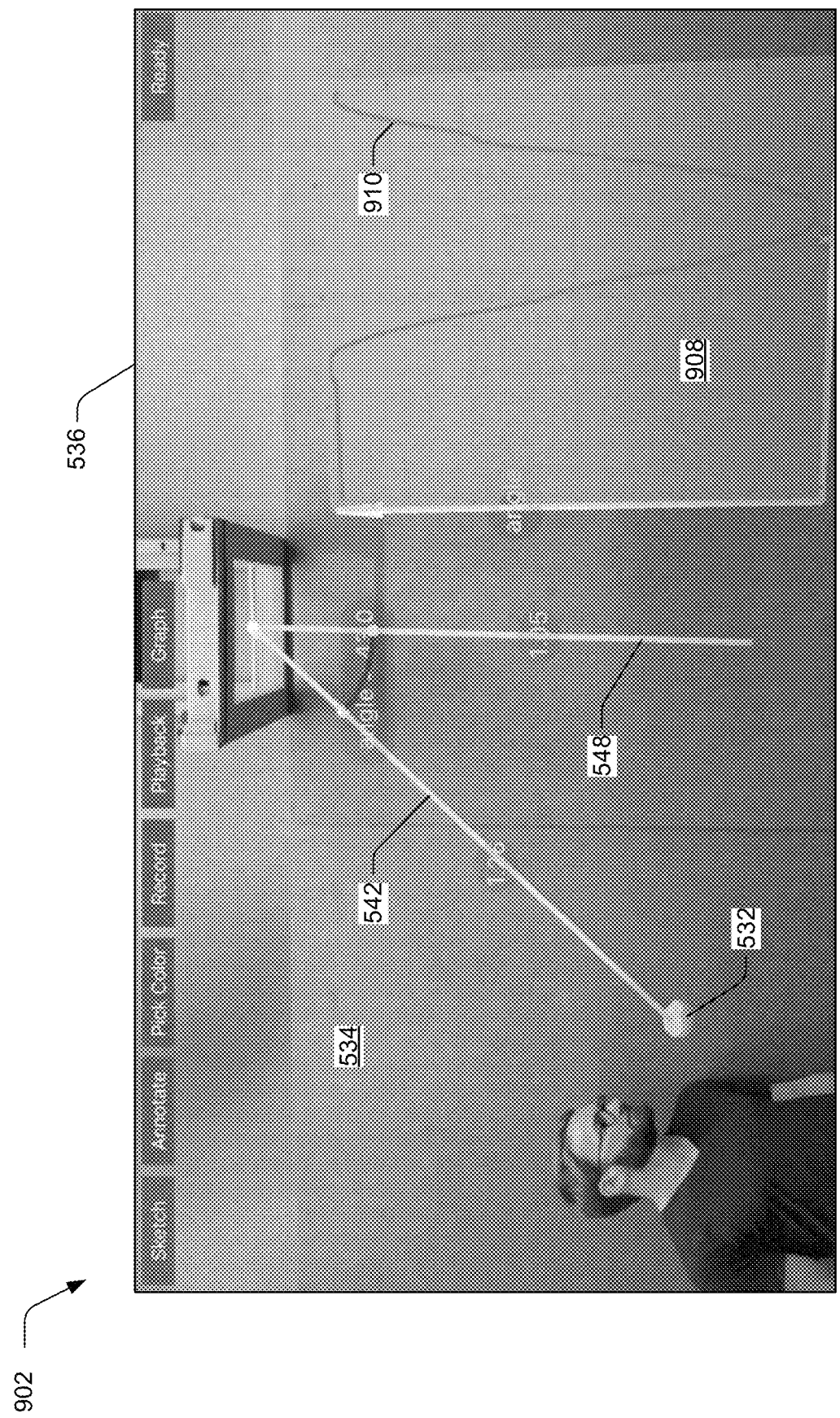
Figure 9C:
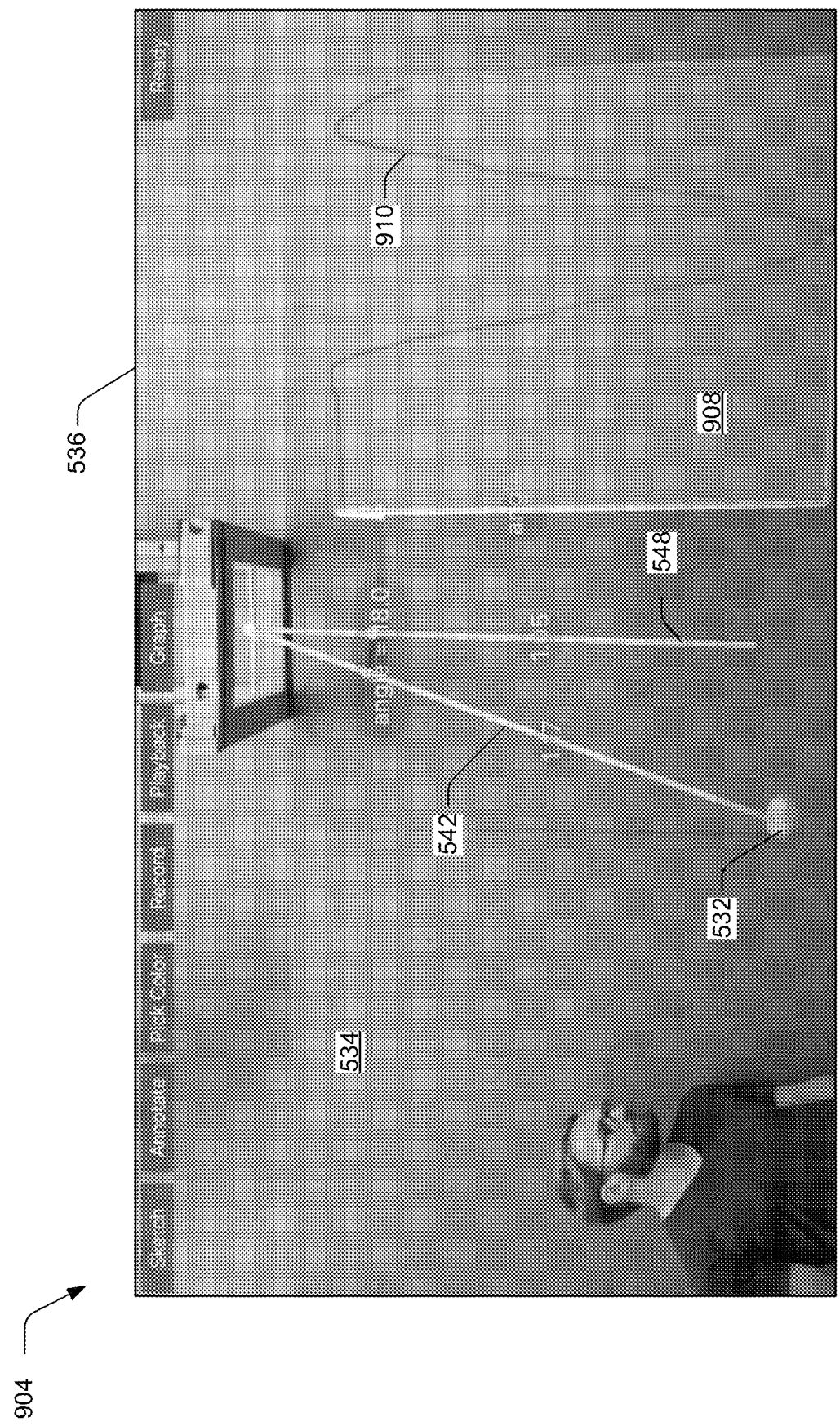
Figure 9D:
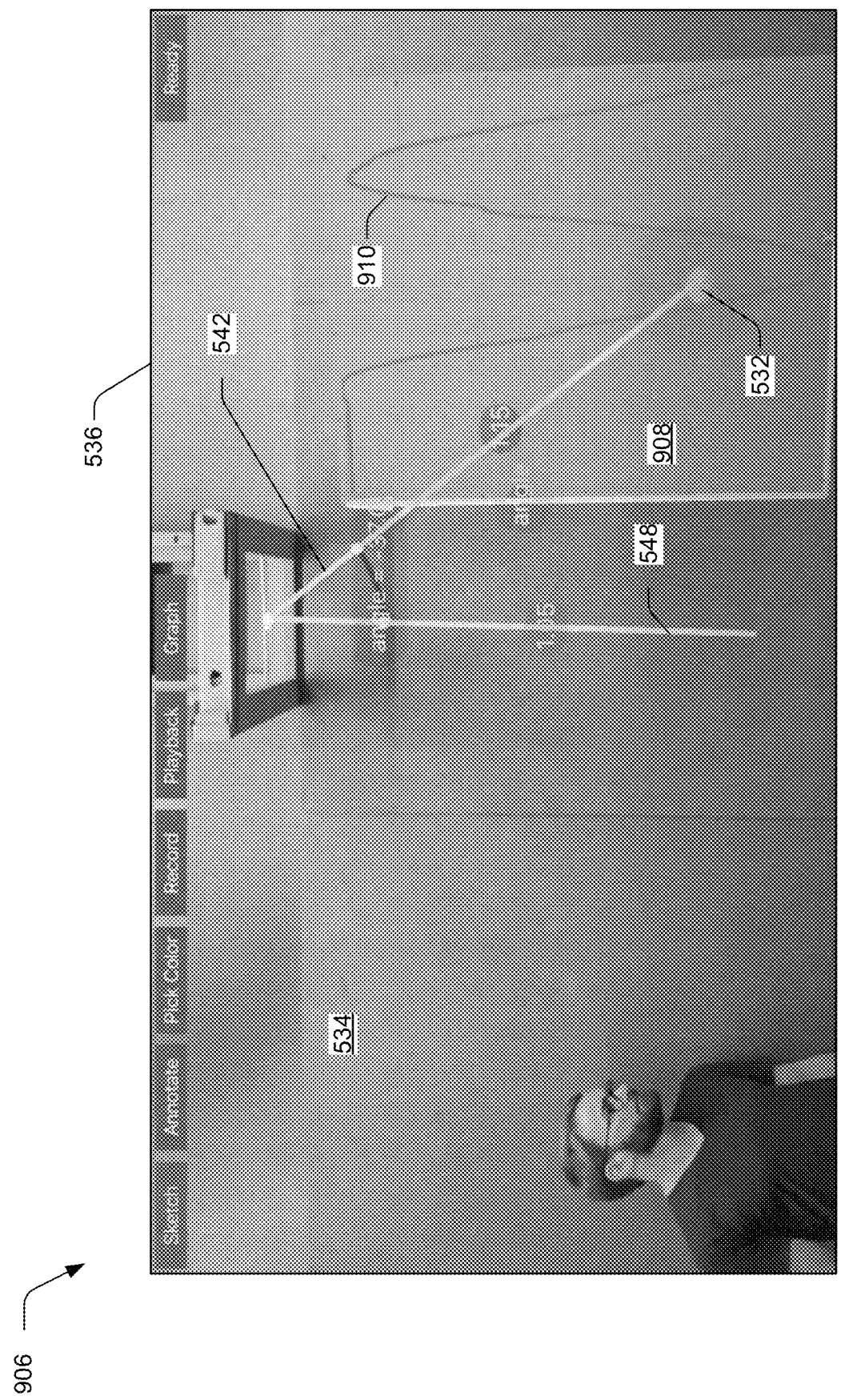

FIGS. 9A, 9B, 9C, and 9D illustrate an example of a two-dimensional graph for visualizing a defined angle. FIG. 9A illustrates a representation 900 of a two-dimensional graph rendered over the digital video 534. FIG. 9B illustrates a representation 902 of the defined angle 554 when the physical object 532 is in a first position within the physical environment 530. FIG. 9C illustrates a representation 904 of the defined angle 554 when the physical object 532 is in a second position within the physical environment 530. FIG. 9D illustrates a representation 906 of the defined angle 554 when the physical object 532 is in a third position within the physical environment 530.

As illustrated in FIG. 9A, the representation 900 includes the physical environment 530 and the physical object 532 which are depicted in the digital video 534 displayed in the user interface 536. The endpoint of the first line segment 542 is bound to the physical object 532 as depicted in the digital video 534 and movement of the physical object 532 in the physical environment 530 causes movement of the first line segment 542 relative to the second line segment 548. This relative movement between the first and second line segments 542, 548 causes the defined angle 554 to change. As shown, a two-dimensional graph 908 is rendered in the user interface 536 over the digital video 534. The sketch module 118 renders the two-dimensional graph 908 to plot the defined angle 554 versus time which may be responsive to a user input described by the input data 126.

As shown in FIG. 9B, the representation 902 includes an enlarged view of the user interface 536. The physical object 532 has moved in the physical environment 330 to a first position which is depicted in the digital video 534. The movement of the physical objet 532 causes the endpoint of the first line segment 542 to move because the first line segment 542 is bound to the physical object 532 as depicted in the digital video 534. The movement of the first line segment 542 changes the defined angle 554 which is visually illustrated in the two-dimensional graph 908. A plot 910 of the two-dimensional graph 908 indicates the defined angle 554 versus time.

As illustrated in FIG. 9C, the physical object 532 has moved to a second position in the physical environment 330 which also causes the first line segment 542 to move closer to the second line segment 548 in the user interface 536. The relative movement between the first line segment 542 and the second line segment 548 decreases the defined angle 554. This decrease is illustrated by the plot 910 of the two-dimensional graph 908 which also decreases.

As shown in FIG. 9D, the physical object 532 has moved to a third position in the physical environment 330. Because the endpoint of the first line segment 542 is bound to the physical object 532 as depicted in the digital video 534, the movement of the physical object 532 causes the first line segment 542 to move past the second line segment in the user interface 536. As shown, this causes the defined angle 554 to become negative or to further decrease relative to the defined angle 554 when the physical object 532 was disposed in the second position in the physical environment 330. This further decrease is illustrated by the plot 910 of the two-dimensional graph 908 which also decreases further.

Example System and Device

Figure 10:
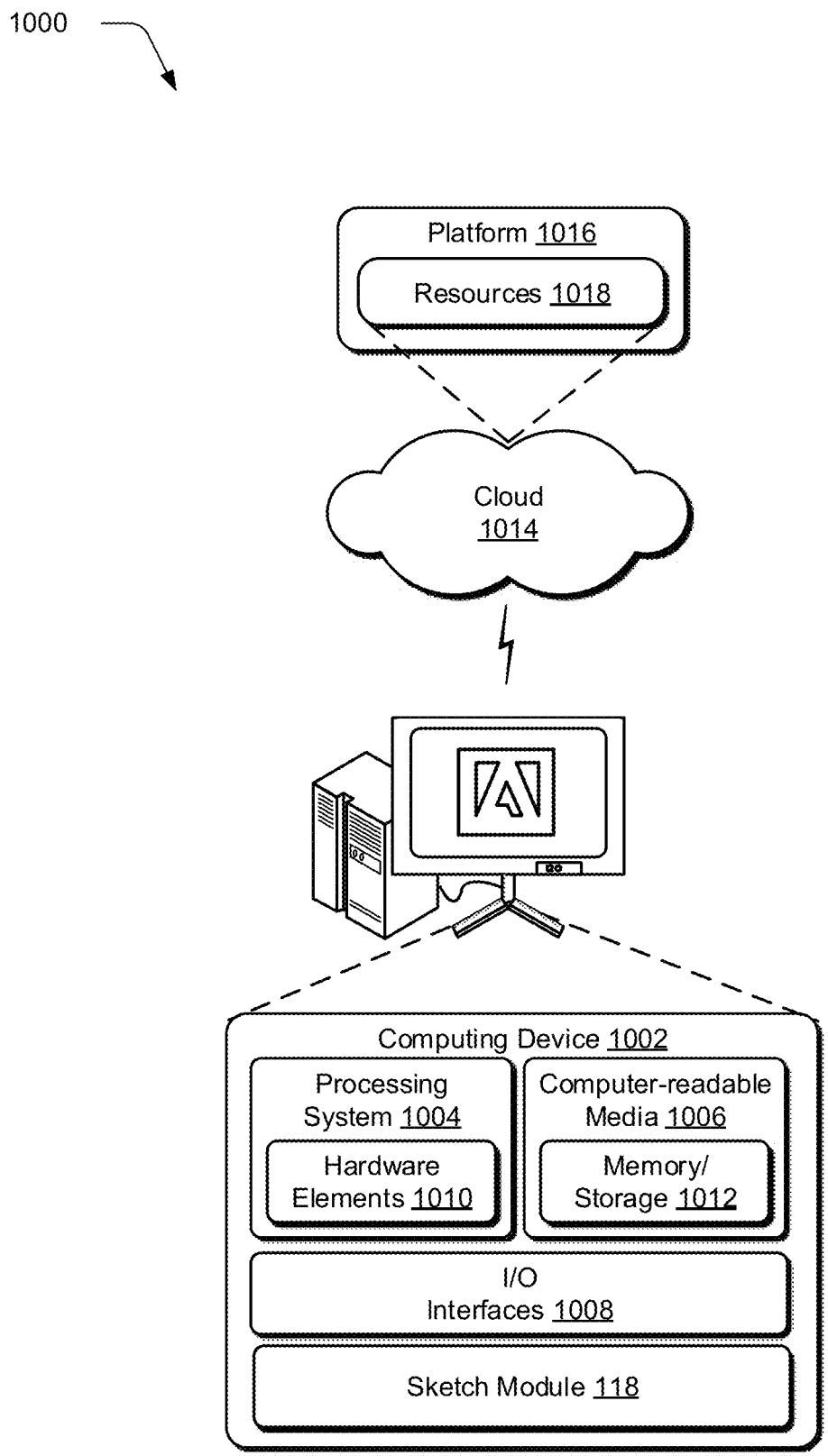
FIG. 10 illustrates an example system that includes an example computing device that is representative of one or more computing systems and/or devices that may implement the various techniques described herein.

FIG. 10 illustrates an example system 1000 that includes an example computing device that is representative of one or more computing systems and/or devices that may implement the various techniques described herein. This is illustrated through inclusion of the sketch module 118. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources 1018 and functions to connect the computing device 1002 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although implementations of systems for augmented reality sketching have been described in language specific to structural features and/or methods, it is to be understood that the appended claims are not necessarily limited to the specific features or methods described. Rather, the specific features and methods are disclosed as example implementations of systems for augmented reality sketching, and other equivalent features and methods are intended to be within the scope of the appended claims. Further, various different examples are described and it is to be appreciated that each described example can be implemented independently or in connection with one or more other described examples.

What is claimed is:

1. In a digital medium environment, a method implemented by a computing device, the method comprising:
   receiving, by the computing device, three-dimensional scene data describing a three-dimensional representation of a physical environment and a physical object;
   displaying, by the computing device, a digital video in a user interface depicting the physical environment and the physical object;
   receiving, by the computing device, a user input specifying two-dimensional coordinates in the user interface corresponding to the physical object; and
   tracking, by the computing device, movements of the physical object in the physical environment and in the digital video by projecting the two-dimensional coordinates into the three-dimensional representation.

2. The method as described in claim 1, further comprising:
   receiving an additional user input sketching a graphical element in the user interface; and
   displaying the graphical element as moving in the user interface corresponding to the movements of the physical object in the physical environment.

3. The method as described in claim 2, further comprising displaying a variable of the graphical element as changing in the user interface corresponding to the movements of the physical object in the physical environment.

4. The method described in claim 3, wherein the variable is a count, a color, or a size.

5. The method as described in claim 1, wherein projecting the two-dimensional coordinates into the three-dimensional representation is based on a detected surface of the physical environment.

6. The method as described in claim 5, further comprising ray casting the two-dimensional coordinates onto the detected surface.

7. The method as described in claim 1, wherein tracking movements of the physical object in the digital video is based at least partially on a color of the physical object.

8. The method as described in claim 1, wherein tracking movements of the physical object in the digital video is based at least partially on an object mask.

9. The method as described in claim 1, further comprising generating an indication of a physical value of the physical environment based on the movements of the physical object in the digital video.

10. The method as described in claim 9, wherein the physical value is a distance, an angle, or an area.

11. A system comprising:
    one or more processors; and
    a computer-readable storage medium storing instructions that are executable by the one or more processors to perform operations comprising:
       receiving three-dimensional scene data describing a three-dimensional representation of a physical environment and a physical object;
       displaying a digital video in a user interface depicting the physical environment and the physical object;
       receiving a user input specifying a color of the physical object; and
       tracking movements of the physical object in the physical environment and in the digital video by projecting two-dimensional coordinates corresponding to the color into the three-dimensional representation.

12. The system as described in claim 11, wherein projecting the two-dimensional coordinates into the three-dimensional representation is based on a detected surface of the physical environment.

13. The system as described in claim 11, wherein tracking movements of the physical object in the digital video is based at least partially on a color of the physical object.

14. The system as described in claim 11, wherein tracking movements of the physical object in the digital video is based at least partially on an object mask.

15. The system as described in claim 11, wherein the operations further comprise:
    receiving an additional user input sketching a graphical element in the user interface; and
    displaying the graphical element as moving in the user interface corresponding to the movements of the physical object in the physical environment.

16. A system comprising:
    means for receiving three-dimensional scene data describing a three-dimensional representation of a physical environment and a physical object;

means for receiving video data describing a digital video depicting the physical environment and the physical object;

means for receiving a user input specifying two-dimensional coordinates in a user interface corresponding to the physical object depicted in the digital video; and means for displaying a graphical element as moving in the user interface corresponding to movements of the physical object in the physical environment.

17. The system as described in claim 16, wherein projecting the two-dimensional coordinates into the three-dimensional representation is based on a detected surface of the physical environment.

18. The system as described in claim 16, wherein tracking movements of the physical object in the digital video is based at least partially on a color of the physical object.

19. The system as described in claim 16, wherein tracking movements of the physical object in the digital video is based at least partially on an object mask.

20. The system as described in claim 16, further comprising means for generating an indication of a physical value of the physical environment based on the movements of the physical object in the digital video.

\* \* \* \* \*